US011506231B2

(12) United States Patent
Landberg et al.

(10) Patent No.: US 11,506,231 B2
(45) Date of Patent: Nov. 22, 2022

(54) MULTIROD FLUID ACTUATOR ARRANGEMENT

(71) Applicant: SAAB AB, Linköping (SE)

(72) Inventors: Magnus Landberg, Linköping (SE); Erik Agerbjörk, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 17/283,268

(22) PCT Filed: Oct. 8, 2018

(86) PCT No.: PCT/SE2018/000023
§ 371 (c)(1),
(2) Date: Apr. 7, 2021

(87) PCT Pub. No.: WO2020/076199
PCT Pub. Date: Apr. 16, 2020

(65) Prior Publication Data
US 2021/0381533 A1 Dec. 9, 2021

(51) Int. Cl.
*F15B 15/26* (2006.01)
*B64C 13/30* (2006.01)
(Continued)

(52) U.S. Cl.
CPC ............ *F15B 15/262* (2013.01); *B64C 13/30* (2013.01); *B64C 13/42* (2013.01); *B64C 13/50* (2013.01);
(Continued)

(58) Field of Classification Search
CPC ......... F15B 11/18; F15B 11/183; F15B 11/22; F15B 15/1409; F15B 15/1447;
(Continued)

(56) References Cited

U.S. PATENT DOCUMENTS 4,526,086 A  7/1985 Holton et al.
7,108,108 B1  9/2006 Heinzeroth
(Continued)

FOREIGN PATENT DOCUMENTS

WO  WO-02055886 A2 *  7/2002 ............. F15B 1/033
WO  2016080874 A1  5/2016
(Continued)

OTHER PUBLICATIONS

Corrected International Preliminary Report on Patentability dated Feb. 1, 2021 for International Patent Application Mo. PCT/SE2018/000023, 16 pages.

*Primary Examiner* — Michael Leslie
*Assistant Examiner* — Matthew Wiblin
(74) *Attorney, Agent, or Firm* — Sage Patent Group

(57) ABSTRACT

A method for controlling a control surface multirod actuator arrangement and the arrangement including: a first and a second multirod actuator configured to move or clamp around a first set of piston rods; a third multirod actuator configured to move or clamp around a second set of piston rods; a control unit configured to control motion of the first set of piston rods in a first motion mode and to control motion of the second set of piston rods in a second motion mode. Steps are moving at least one piston rod of first set of piston rods and/or clamping in parked position at least one piston rod of the second set of piston rods.

12 Claims, 9 Drawing Sheets

(51) Int. Cl.
  *B64C 13/42*   (2006.01)
  *B64C 13/50*   (2006.01)
  *F15B 15/14*   (2006.01)
(52) U.S. Cl.
  CPC .... *F15B 15/1409* (2013.01); *F15B 2015/268* (2013.01); *F15B 2211/7054* (2013.01)
(58) Field of Classification Search
  CPC .. F15B 15/1466; F15B 15/262; F15B 15/265; F15B 15/268; F15B 15/28; F15B 15/2838
  See application file for complete search history.

(56) References Cited

U.S. PATENT DOCUMENTS

2015/0037448 A1* 2/2015 Schultz ............... B29C 45/7626
                                                          425/162
2019/0293093 A1* 9/2019 Landberg ............. F15B 15/262

FOREIGN PATENT DOCUMENTS

| WO | 2016171594 A1 | 10/2016 |
| WO | 2017052463 A1 | 3/2017 |
| WO | 2017086844 A1 | 5/2017 |
| WO | 2017127001 A1 | 7/2017 |
| WO | 2017200440 A1 | 11/2017 |
| WO | 2017200441 A1 | 11/2017 |
| WO | 2018190756 A1 | 10/2018 |

* cited by examiner

MULTIROD FLUID ACTUATOR ARRANGEMENT

CROSS-REFERENCE TO RELATED APPLICATIONS

This application is a 35 U.S.C § 371 national stage application for International Application No. PCT/SE2018/000023, entitled "A MULTIROD FLUID ACTUATOR ARRANGEMENT", filed on Oct. 8, 2018, the disclosures and contents of which are hereby incorporated by reference in their entireties.

TECHNICAL FIELD

The present invention relates to a multirod fluid actuator arrangement. The present invention further may relate to an aircraft control surface multirod actuator arrangement and an aircraft comprising the aircraft control surface multirod actuator arrangement. The present invention also relates to a method for operating the multirod fluid actuator arrangement or aircraft control surface multirod actuator arrangement.

The present invention concerns the industry using hydraulic actuators for different types of applications and concerns the manufacture industry producing multirod actuator arrangements. The present invention also concerns the industry producing vehicles, such as aircraft, comprising control systems for controlling primary and secondary control surfaces.

BACKGROUND

Current fluid actuator arrangements and aircraft control surface actuators are dependent on large cylinder chamber volumes for providing long strokes and fluid leakage occurring at valve devices is energy consuming. Electromechanical actuators may also be used. However, they are energy consuming and heavy and may generate heat. WO 2012/152253 discloses a fluid actuator arrangement having a plurality of piston rods, each actuated in dependency to the motion of an opposite piston rod.

Current aircraft control surface actuators of an aircraft may leak hydraulic fluid due to leakage in continuous and adjustable control valves needed for prior art control systems, wherein internal leakage between the pressure side and the return side of the valve occurs for achievement of continuous motion of the piston. A major part of energy is needed for pressurizing the prior art cylinders during flight and to balance the piston body in the cylinder housing. Current control systems are able to pressurize and balance the actuators by permitting a certain leakage of pressurized fluid from the continuous and adjustable control valves. Just a few percent of the total hydraulic energy consumption being used for required aircraft performance in flight. Current arrangement have poor efficiency and uses a major part of energy consumption for said leakage.

SUMMARY OF THE INVENTION

There is an object to provide an energy saving multirod fluid actuator arrangement and/or aircraft control surface multirod actuator arrangement.

There is an object to provide a compact and lightweight multirod fluid actuator arrangement of the type defined in the introduction.

There is an object to provide a compact and lightweight aircraft control surface multirod actuator arrangement of the type defined in the introduction.

There is an object to provide an aircraft comprising the aircraft control surface multirod actuator arrangement, which aircraft is of low weight and which is configured to use low energy consumption.

There is an object to provide storability and easy disassembly of an aircraft for transport.

There is an object to provide easy and cost effective testing of the aircraft control surface multirod actuator arrangement after storage or transport.

There is an object to provide an aircraft control surface multirod actuator arrangement exhibiting redundancy on primary control surfaces.

There is an object to provide an aircraft control surface multirod actuator arrangement of an aircraft configured for high cruise speed.

There is an object to provide an energy saving aircraft control surface multirod actuator arrangement that is configured to generate and distribute mechanical linear movement and force.

There is an object to provide an energy saving aircraft control surface multirod actuator arrangement that uses as few complex fluid leaking control valves as possible, but still the arrangement provides suitable flight control.

There is an object to provide an energy saving aircraft control surface multirod actuator arrangement that is cost-effective to manufacture and in service maintenance.

There is an object to provide an energy saving aircraft control surface multirod actuator of a flight control system that supplies hydraulic power for all aircraft operational phases in normal and degraded modes even in case of eventual external fluid leakage and/or fluid supply failure and/or fluid pump failure.

There is an object to provide an aircraft comprising a slender wing profile for reducing drag.

There is an object to provide an aircraft that exhibits low drag, low fuel consumption and that is able to fly long missions achieved by low energy consumption.

There is an object to provide an aircraft that have no hydraulic lines in the wing providing for easy mounting of the wing to the fuselage of the aircraft.

There is an object to provide small and light reservoir and accumulator arrangement of the aircraft control surface multirod actuator arrangement still providing high fluid pressure, such as 5000-6000 Psi.

This or at least one of said objects has been achieved by a method for controlling a multirod fluid actuator arrangement and/or an aircraft control surface multirod actuator arrangement which comprises; a first and a second multirod actuator configured to move or clamp around a first set of piston rods; a third multirod actuator configured to move or clamp around a second set of piston rods; a control unit configured to control the motion of the first set of piston rods in a first motion mode and to control the motion of the second set of piston rods in a second motion mode.

The method may comprise the steps of: moving at least one piston rod of the first set of piston rods and/or clamping in parked position at least one piston rod of the second set of piston rods; clamping in parked position at least one piston rod of the first set of piston rods and clamping in parked position at least one piston rod of the second set of piston rods; and clamping in parked position at least one piston rod of the first set of piston rods and moving at least one piston rod of the second set of piston rods.

Alternatively, the method comprises the steps of: moving the first set of piston rods and clamping in parked position the second set of piston rods; clamping in parked position the first set of piston rods and clamping in parked position the second set of piston rods; and clamping in parked position the first set of piston rods and moving the second set of piston rods.

Alternatively, the multirod fluid actuator arrangement comprises a fluid supply comprising a first fluid supply system that comprises a first motor coupled to a first fluid pump.

Alternatively, the multirod fluid actuator arrangement comprises a second fluid supply system that comprises a fluid accumulator tank member and/or a second motor coupled to a second fluid pump.

Alternatively, the first, second and/or third piston body being pressurized in parked position by means of the fluid accumulator tank member and/or the second motor coupled to the second fluid pump of the second fluid supply system.

Alternatively, moving the first set of piston rods being achieved by pressurizing a first and second set of clamping devices of the first respective second multirod actuator also being pressurized for moving the first set of piston rods by means of the first fluid supply system and/or the second fluid supply system.

Alternatively, clamping the second set of piston rods being achieved by pressurizing a third set of clamping devices of the third multirod actuator also being pressurized in parked position by means of the fluid accumulator tank member and/or a second motor coupled to a second fluid pump of the second fluid supply system.

Alternatively, the method comprises the step of clamping the first set of piston rods being achieved by pressurizing the first and second set of clamping devices of the first respective second multirod actuator, and also in parked position, by means of the second fluid supply system, and moving the second set of piston rods being achieved by pressurizing the third set of clamping devices and also pressurizing the third multirod actuator for moving the second set of piston rods by means of the second fluid supply system.

Alternatively, the first fluid pump and the first motor of the first fluid supply system being shut off and the second fluid pump and the second motor of the second fluid system being shut off in a loitering mode, whereas the pressurized fluid accumulator tank member is used for pressurizing the clamping devices of the first, second and third multirod actuator for locking the first and second set of piston rods, and is used for holding the second piston body in a direction opposite the holding of the first piston body, whereas the holding of the first piston body is achieved by closing the return flow from the first multirod actuator.

Alternatively, the clamping of at least one piston rod of the first set of piston rods in parked position and the clamping of at least one piston rod of the second set of piston rods in parked position being a loitering mode.

Alternatively, the clamping of at least one piston rod of the first set of piston rods in parked position and moving at least one piston rod of the second set of piston rods being a loitering mode and trim mode.

Alternatively, the pressurizing for holding in parking position the at least one piston rod is achieved by feeding fluid from a fluid accumulator tank member to the at least one clamping device of the first, second and third multirod actuator.

This or at least one of said objects has been achieved by an aircraft control surface multirod actuator arrangement comprising; a first and a second multirod actuator configured to move a first set of piston rods; a third multirod actuator configured to move a second set of piston rods; a control unit configured to control the motion of the first set of piston rods in a first motion mode and to control the motion of the second set of piston rods in a second motion mode.

Alternatively, the first, second and third multirod actuator is coupled to a fluid supply via valve devices.

Alternatively, the first motion mode constitutes an aircraft start/landing/climb/descent/turn mode.

Alternatively, the second motion mode constitutes an aircraft loitering mode.

Alternatively, the first fluid pressure is equal to the second fluid pressure.

Alternatively, the valve devices comprises; a first servo valve coupled to a first cylinder housing for moving a first piston body; a second servo valve coupled to a second cylinder housing for moving a second piston body; a third servo valve coupled to a third cylinder housing for moving a third piston body; a respective first logic valve of a first set of logic valves coupled to a respective first clamping device of a first set of clamping devices of the first piston body; a respective second logic valve of a second set of logic valves coupled to a respective second clamping device of a second set of clamping devices of the second piston body; a respective third logic valve of a third set of logic valves coupled to a respective third clamping device of a third set of clamping devices of the third piston body.

Alternatively, the fluid supply comprises a first fluid supply system and a second fluid supply system, the second fluid supply system comprises a fluid accumulator tank member configured to supply fluid to the third multirod actuator for moving the second set of piston rods in said second motion mode.

Alternatively, the first fluid supply system operates independently from the second fluid supply system.

Alternatively, the first fluid supply system comprises a first motor coupled to a first fluid pump configured to generate a first fluid pressure to move and clamp around the first set of piston rods by means of the second multirod actuator.

Alternatively, the second fluid supply system comprises a second motor coupled to a second fluid pump configured to generate a second fluid pressure to move and clamp around the first set of piston rods by means of the first multirod actuator Alternatively, the second motor is also configured to generate the second fluid pressure to move and clamp around the second set of piston rods by means of the third multirod actuator.

Alternatively, the second motor and second fluid pump also being configured to generate the second fluid pressure for pressurizing the fluid accumulator tank member, e.g. intermittent, 2-3 seconds every 5-10 minute period when the aircraft flies in loitering mode.

Alternatively, the first motor and first fluid pump being shut off for saving energy during the loitering mode.

Alternatively, the accumulator tank member is of such volume that primary control surfaces are able to be moved by the first set of piston rods also in turbulence for maintaining correct flight performance, i.e. at flight level and/or wings level.

Alternatively, the control unit is configured to switch off the first and/or second motor and to control the third multirod actuator, whereas the fluid accumulator tank of the second fluid supply system is configured to provide fluid to the third multirod actuator for moving the second set of piston rods in said second motion mode.

Alternatively, the fluid accumulator tank is configured to be re-charged by the first and/or second fluid pump.

Alternatively, the first and second motor may be replaced by a single motor.

Alternatively, the first and second fluid system may use a common fluid supply reservoir.

Alternatively, the first and second motor may be electrically coupled to a battery pack and/or an engine driven generator.

Alternatively, the logic valve may comprise two on/off valves or 3/2 valve or other valve that can be controlled to permit hydraulic flow or shut off the hydraulic flow.

Alternatively, a first set of clamping devices associated with the first set of piston rods (e.g. coupled to the primary control surfaces of the aircraft) is configured for individually engagement with each piston rod of the first set of piston rods.

Alternatively, a second set of clamping devices associated with the second set of piston rods (e.g. coupled to the secondary control surfaces of the aircraft) is configured for individually engagement with each of the piston rods of the second set of piston rods.

Alternatively, the respective first logic valve each being coupled to the respective first clamping device configured to be controlled to alternately clamp around a respective piston rod of either the first set of piston rods or the second set of piston rods.

Alternatively, the respective second logic valve each being coupled to the respective second clamping device configured to be controlled to alternately clamp around a respective piston rod of either the first set of piston rods or the second set of piston rods.

Alternatively, the respective third logic valve each being coupled to the respective third clamping device configured to be controlled to alternately clamp around a respective piston rod of either the first set of piston rods or the second set of piston rods.

Alternatively, the respective piston rod of the first set of piston rods is coupled or able to be coupled to the respective primary control surface via rods and/or cables.

Alternatively, the respective piston rod of the second set of piston rods is coupled or able to be coupled to the respective secondary control surface via rods and/or cables.

Alternatively, the aircraft control surface actuator with fluid pumps and motors being positioned in the fuselage of the aircraft.

In such way, due to shutting off the fluid pumps and motors during the loitering mode, there will be achieved no heat generation and saving of energy.

By positioning the aircraft control surface mulitrod actuator in the fuselage and couple the first and second set of piston rods to the primary and secondary control surfaces of the aircraft via a linkage arrangement (e.g. rods and/or wires), the wing profile can be made very thin and the wing per se can be mounted to the fuselage in an easy way.

This or at least one of said objects has been achieved by an aircraft comprising the aircraft control surface actuator, wherein the first motion mode comprises motion of primary control surfaces of an aircraft and the second motion mode comprises motion of secondary control surfaces of the aircraft.

Alternatively, the multirod fluid actuator arrangement comprises; a first cylinder housing; a first piston body; a second cylinder housing; a second piston body; the first piston body comprises a first and second set of through-bores; the second piston body comprises a third set of through-bores; a first set of piston rods arranged in the first and third set of through-bores; a second set of piston rods arranged in the second set of through-bores; a first, second and third set of clamping devices, a third cylinder housing; a third piston body comprising a fifth and sixth set of through-bores; the first set of piston rods is arranged through the fifth set of through-bores and the second set of piston rods is arranged through the sixth set of through-bores; the first piston body is configured to separately engage and move each piston rod of the first and second set of piston rods a first distance; the second piston body is configured to separately engage and move each piston rod of the first set of piston rods a second distance; the third piston body is configured to separately engage and move each piston rod a third distance.

Alternatively, a control unit of the arrangement is configured to control the motion of the first and second piston body in a first motion mode and to control the motion of the third piston body in a second motion mode.

Alternatively, the first motion mode comprises motion of primary control surfaces and the second motion mode comprises motion of secondary control surfaces.

Alternatively, the first set of piston rods are configured to be coupled to primary control surfaces of an aircraft.

Alternatively, the second set of piston rod are configured to be coupled to secondary control surfaces of an aircraft.

Alternatively, any piston rod of the first set of piston rods may be coupled to a primary control surface that also is utilized as a secondary control surface.

The primary control surface may be an aileron, a rudder and/or elevator and the secondary control surface may be a trim arrangement of a separate trim control surface, such as a trim tab surface, or trim mechanism of the primary control surface per se.

Alternatively, the multirod fluid actuator arrangement comprises a first cylinder housing comprising a first and a second head member.

Alternatively, a first piston body slidable arranged in the first cylinder housing.

Alternatively, a second cylinder housing comprising a first and second head body.

Alternatively, a second piston body slidable arranged in the second cylinder housing.

Alternatively, in parking position, the first piston body is positioned against the first head member of the first cylinder housing and the second piston body is positioned against the second head body of the second cylinder housing.

Alternatively, the parking of the respective first and second piston body comprises pressurization of the respective first and second cylinder houses for holding the first and second piston body toward the respective first head member and second head body.

Alternatively, the first head member and second head body are opposite each other, either facing each other or facing away from each other, for achieving that they are able to be locked relative each other in play free engagement and holding the respective first and/or second piston rod in parked position.

Alternatively, the first piston body exhibits a first set of through-bores and a second set of through-bores that extend through the first piston body in an axial direction.

Alternatively, the second piston body exhibits a third set of through-bores that extend through the second piston body in the axial direction.

Alternatively, a first set of piston rods arranged slidable in the first and third set of through-bores.

Alternatively, a second set of piston rods arranged slidable in the second set of through-bores.

Alternatively, the first set of through-bores comprises a first set of engagement and disengagement devices and the second set of through-bores comprises a second set of engagement and disengagement devices, the third set of through-bores comprises a third set of engagement and disengagement devices.

Alternatively, each piston rod of said first and second set of piston rods being configured to be individually engaged or disengaged by a clamping device of the first, second or third set of clamping devices.

Alternatively, a third cylinder housing comprises a first and second head element.

Alternatively, a third piston body is slidable arranged in the third cylinder housing.

Alternatively, the third piston body exhibits a fifth and sixth set of through-bores that extend through the third piston body in the axial direction and the first set of piston rods is arranged slidable in the fifth set of through-bores and the second set of piston rods is arranged slidable in the sixth set of through-bore.

Alternatively, the first piston body is configured to separately engage and move each piston rod of the first and second set of piston rods a first distance corresponding with a first piston stroke length of the first piston body.

Alternatively, the second piston body is configured to separately engage and move each piston rod of the first set of piston rods a second distance corresponding with a second piston stroke length of the second piston body.

Alternatively, the third piston body is configured to separately engage and move said each piston rod of the first and second set of piston rods a third distance corresponding with a third piston stroke length of the third piston body; wherein the first and second piston stroke length is longer than the third piston stroke length.

Alternatively, there is provided a multirod fluid actuator arrangement comprising; a first cylinder housing comprising a first head member and a second head member; a first piston body is slidable arranged in the first cylinder housing; the first piston body divides a first interior of the first cylinder housing into a first cylinder chamber and a second cylinder chamber; a second cylinder housing comprising a first head body and a second head body; a second piston body is slidable arranged in the second cylinder housing; the second piston body divides a second interior of the second cylinder housing into a first chamber and a second chamber, the first piston body exhibits a first set of through-bores and a second set of through-bores that extend through the first piston body in an axial direction; the second piston body exhibits a third set of through-bores and a fourth set of through-bores that extend through the second piston body in the axial direction.

Alternatively, a first set of piston rods is arranged slidable in the first set of through-bores and in the third set of through-bores; a second set of piston rods is arranged slidable in the second set of through-bores and in the fourth set of through-bores; the first set of through-bores comprises a first set of engagement and disengagement devices and the second set of through-bores comprises a second set of engagement and disengagement devices, the third set of through-bores comprises a third set of engagement and disengagement devices.

Alternatively, a fourth set of through-bores comprises a fourth set of engagement and disengagement devices, wherein each piston rod of said first and second set of piston rods being configured to be individually engaged or disengaged by an engagement and disengagement device of the first, second, third or fourth set of engagement and disengagement devices.

Alternatively, a third cylinder housing comprises a first head element and a second head element; a third piston body is slidable arranged in the third cylinder housing; the third piston body divides a third interior of the third cylinder housing into a first chamber and a second chamber, the third piston body exhibits a fifth set of through-bores and a sixth set of through-bores that extend through the third piston body in the axial direction; the first set of piston rods is arranged slidable in the fifth set of through-bores and the second set of piston rods is arranged slidable in the sixth set of through-bores.

Alternatively, the first piston body is configured to engage and move each piston rod of the first and second set of piston rods a first distance corresponding with a first piston stroke length of the first piston body; the second piston body is configured to engage and move each piston rod of the first and second set of piston rods a first distance corresponding with a second piston stroke length of the second piston body; the third piston body is configured to engage and move each piston rod of the first and second set of piston rods a third distance corresponding with a third piston stroke length of the third piston body. The first and second piston stroke length is longer than the third piston stroke length.

Alternatively, the multirod actuator may comprise a cylinder housing, a piston body, a first and second set of through bores of the piston body, through which first set of through bores is arranged a first set of piston rods and through which second set of through bores is arranged a second set of piston rods.

The respective through bore may be provided with a respective clamping device for clamping on the actual piston rod for moving it together with the actuated piston body.

In such way the respective piston rod of said first and second set of piston rods can be moved with the respective piston body.

The respective clamping device may be arranged around and co-axially the respective through bore and having by fluid expandable hollow space that expands a clamping membrane in contact with the piston rod.

Alternatively, the fluid actuator arrangement is configured to be used in large and/or small unmanned aerial vehicles.

Alternatively, the fluid actuator arrangement is configured to be used in large and/or small unmanned aerial combat vehicles.

Alternatively, the aircraft comprises at least two aircraft control surface multirod actuators.

Alternatively, the fluid comprises hydraulic oil.

Alternatively, the first and second set of engagement and disengagement devices are configured for providing individual engagement or disengagement to or from a respective piston rod of said first and second set of piston rods.

Alternatively, an aircraft control surface multirod actuator system comprises the aircraft control surface multirod actuator.

Alternatively, the aircraft control surface multirod actuator system comprises at least two aircraft control surface multirod actuators.

Alternatively, the aircraft control surface multirod actuator system comprises at least two independent fluid supply arrangements.

Alternatively, the fluid supply system is coupled to the first cylinder housing for moving the first piston body forward and backward in the first cylinder housing continuously via a first continuous and adjustable control valve, such as a first servo valve.

Alternatively, the fluid supply system is coupled to the second cylinder housing for moving the second piston body forward and backward in the second cylinder housing continuously via a second continuous and adjustable control valve, such as a second servo valve.

Alternatively, a piston rod of the first set of piston rods is configured to be locked in position by means of a static clamping device arranged around the piston rod and shutting off the first continuous and adjustable control valve coupled to the first cylinder housing.

Alternatively, a piston rod of the first set of piston rods is configured to be locked in position by means of the static clamping device arranged around the piston rod and shutting off the second continuous and adjustable control valve coupled to the second cylinder housing.

Alternatively, a static clamping device is positioned locally for clamping a push rod coupled to a control surface, which clamping is provided adjacent the control surface.

In such way, the control surfaces of a high-speed (capable to fly faster than Mach 1) aircraft can be locked in an energy saving way.

Alternatively, the accumulator tank member charged with pressurized fluid is configured to pressurize the third cylinder housing for moving the third piston body forward and backward by means of a logic valve arrangement coupled between the accumulator tank member and the third cylinder housing.

Since the third piston stroke length of the third piston body between first and second head element of the third cylinder housing is shorter than the stroke length that the respective first and second piston body being configured to perform between the heads of the respective first and second cylinder housing, and such short stroke length is only needed for secondary control surfaces, such as trim, the aircraft can perform its flight with small stabilizing manoeuvres requiring very low energy consumption.

Alternatively, the third stroke length is 2-5 mm, preferably 3-4 mm.

Alternatively, the third stroke length is adapted to the required motion of the secondary control surface providing stable flight through the air when the aircraft flies in the loitering mode.

In such way is achieved that the aircraft control surface multirod actuator can be adapted for different piston rod force requirements by changing the stroke length without changing torque and stiffness.

Alternatively, the second piston body further exhibits a fourth set of through-bores that extend through the second piston body in the axial direction.

Alternatively, the second set of piston rods is arranged slidable also in the fourth set of through-bores.

Alternatively, the fourth set of through-bores comprises a fourth set of through-bores.

Alternatively, each piston rod of said first and second set of piston rods being configured to be individually engaged or disengaged by an engagement and disengagement device of the first, second or third set of engagement and disengagement devices.

Alternatively, if a secondary control surface is required to be move a further motion than achieved by the third stroke length, the control unit is configured to provide that the third piston body of the third multirod actuator makes a new stroke from a starting position.

Alternatively, the first and/or second multirod actuator holds in static position the second set of piston rods concerned, meanwhile the third piston body makes a retraction stroke to a starting position.

Alternatively, the multirod fluid actuator arrangement comprises; a first cylinder housing comprising a first head member and a second head member; a first piston body is slidable arranged in said first cylinder housing; the first piston body divides the first cylinder housing interior into a first cylinder chamber and a second cylinder chamber, which are coupled to a fluid supply system; the first piston body exhibits a first set of through-bores and a second set of through-bores that extend through the first piston body in an axial direction; a first set of piston rods is arranged slidable in the first set of through-bores and a second set of piston rods is arranged slidable in the second set of through-bores; and the first set of first through-bores comprises a first set of clamping devices and the second set of through-bores comprises a second set of clamping devices, which are arranged for providing individual engagement or disengagement to or from the respective piston rod; a sensor member is associated with the respective piston rod for measuring the position of the respective piston rod, wherein the sensor member is configured to measure the position of the piston body relative the cylinder housing.

Alternatively, the fluid actuator arrangement comprises a second cylinder housing comprising a first head body and a second head body; a second piston body is slidable arranged in said second cylinder housing; the second piston body divides the second cylinder housing interior into a first cylinder chamber and a second cylinder chamber, which are coupled to the fluid supply system; the second piston body exhibits a third through-bore and a fourth through-bore that extend through the second piston body in the axial direction; the first piston rod is arranged slidable in the third through-bore and the second piston rod is arranged slidable in the fourth through-bore; and the third through-bore comprises a third clamping device and the fourth through-bore comprises a fourth clamping device, which are arranged for providing individual engagement or disengagement to or from the respective first and second piston rod; a second sensor member is associated with the first piston rod for measuring the position of the first piston rod, wherein the second sensor member is configured to measure the position of the second piston body relative the second cylinder housing.

Alternatively, the first sensor member is configured to measure the position of the first piston body relative the first cylinder housing and feeds a first piston body position data to a control unit.

Alternatively, the control unit is configured to register the history of engagements of the first piston body to the respective first and second piston rod.

Alternatively, the second sensor member is configured to measure the position of the second piston body relative the second cylinder housing and feeds a second piston body position data to the control unit.

Alternatively, the control unit is configured to register the history of engagements of the second piston body to the respective first and second piston rod.

Alternatively, the fluid actuator arrangement comprises a sensor device coupled to the control unit adapted to control the motion of the respective piston rod according to a feedback loop and adapted to compare a desired position value with an actual position value of the position of respective piston rod relative the first cylinder housing.

This or at least one of said objects has been achieved by a data medium storing program adapted for controlling the motion of an aircraft control surface multirod actuator system, comprising; a first and a second multirod actuator configured to move or clamp around a first set of piston rods; a third multirod actuator configured to move or clamp around a second set of piston rods; a control unit configured to control the motion of the first set of piston rods in a first motion mode and to control the motion of the second set of piston rods in a second motion mode; wherein said data medium storing program comprises a program code stored on a medium, which is readable on a computer, for causing a control unit to perform the method steps of: moving at least one piston rod of the first set of piston rods and/or clamping in parked position at least one piston rod of the second set of piston rods; clamping in parked position at least one piston rod of the first set of piston rods and clamping in parked position at least one piston rod of the second set of piston rods; and clamping in parked position at least one piston rod of the first set of piston rods and moving at least one piston rod of the second set of piston rods.

A data medium storing program product comprising a program code stored on a medium, which is readable on a computer, for performing at least one of the above-mentioned method steps, when a data medium storing program is run on the control unit.

In such way is achieved that the use of energy is minimized and used in an optimal way.

In such a way, the motor driving the fluid pump can be shut off in loitering mode, which in turn provides high energy efficiency and low cooling requirement.

In such way there is possibly to use less costly and less complex and less energy consuming control valves.

In such way there is possibly to use standard directional and on/off valves.

In such way is achieved that the number of continuous and adjustable control valves can be reduced.

In such way is achieved that the fluid flow and fluid supply energy need is reduced by disengaging the secondary control surfaces and use the fluid supply only to the primary control surfaces for stabilizing the aircraft during flight in e.g. turbulence and only use of one category of control surfaces (e.g. ailerons).

In this way only one sensor member needs to be mounted to the respective piston body, wherein the motion of the piston body and actual clamping of a specific piston rod is registered achieving that the motions and positions of the piston rods can be determined.

In such way is achieved that very small quantity of fluid is needed.

In such way is achieved that low heat generation is provided by the aircraft control surface multirod actuator.

In such way is achieve that no heat is generated in the wing.

In such way is achieved a thin wing profile resulting in low signature feature.

Alternatively, the first and second piston bodies are in parked position in loitering mode.

Alternatively, the first piston body abuts the first head member of the first cylinder housing and the second piston body abuts the second head member of the second cylinder housing for providing the parked position of the piston bodies in loitering mode.

Alternatively, the second and fourth set of engagement and disengagement devices are controlled not to clamp around the second set of piston rods in loitering mode.

Alternatively, the first and third set of engagement and disengagement devices are controlled to clamp around the first set of piston rods in loitering mode.

Alternatively, the first and second multirod actuator are configured as a primary surface (e.g. aileron, elevator) actuator unit.

Alternatively, the third multirod actuator is configured as a secondary surface (e.g. trim surface) actuator.

Alternatively, a logic directional valve is arranged between the second fluid supply and the third cylinder housing for controlling the third piston body to move between the cylinder heads of the third cylinder housing.

In such a way the internal fluid leakage is eliminated, still achieving small adjustments of the secondary control surface, which may be needed during the loitering mode.

Alternatively, the fluid supply comprises a first fluid supply system and a second fluid supply system, the second fluid supply system comprises a fluid accumulator tank member configured to supply fluid to the third multirod actuator for moving the second set of piston rods in said second motion mode.

Alternatively, the first fluid supply system and a second fluid supply system being shut off for saving energy during the loitering mode, wherein the aircraft control surface multirod actuator arrangement adopts the fluid accumulator tank member for fluid pressurization of the first, second and third multirod actuator.

This may also be solved by an aircraft comprising a control surface multirod actuator arrangement comprising a first and a second multirod actuator configured to move a first set of piston rods; a third multirod actuator configured to move a second set of piston rods; a control unit configured to control the motion of the first set of piston rods in a first motion mode and to control the motion of the second set of piston rods in a second motion mode.

Alternatively, the first set of piston rods are coupled to primary control surfaces of an aircraft and the second set of piston rods are coupled to secondary control surfaces (e.g. trim control surfaces) of the aircraft.

Alternatively, the aircraft is an aircraft with a morphing wing or so called flexible wing or a so called flying wing, wherein the primary control surfaces are coupled to the first set of piston rods.

Alternatively, the aircraft is an aircraft with a morphing wing or so called flexible wing or a so called flying wing, wherein the secondary control surfaces are coupled to the second set of piston rods.

Alternatively, the at least one primary control surface comprises a flexible portion of a morphing wing of an aircraft.

Alternatively, the at least one secondary control surface comprises a flexible portion of a morphing wing of an aircraft.

Alternatively, the morphing wing of an aircraft comprises a multifunctional system of composite matrix lightweight materials and integrated multirod fluid actuator arrangements positioned in the central area of morphing wing (flying wing) or positioned in a fuselage of an aircraft comprising a morphing wing.

The expression engagement and disengagement device may be called clamping device or vice versa.

The expression motor may be replaced by the expression electrical motor.

The expression control valve may comprise a modulating valve, which can be set to any position between fully open and fully closed, valve positioners are used to ensure the valve attains the desired degree of opening.

The expression control valve may mean a modulating valve, which can be set to any position between fully open and fully closed, valve positioners are used to ensure the valve attains the desired degree of opening.

The expression control valve may mean continuous and adjustable control valve.

The expression control valve may mean servo valve.

The wording fluid actuator arrangement may be replaced by the wording aircraft control surface multirod actuator or vice versa.

The wording clamping device can be replaced by the wording engagement and disengagement device.

The wording fluid actuator or actuator may be replaced by hydraulic actuator.

The loitering mode may be defined as a mode wherein the control system of the vehicle, e.g. the control system of an aircraft, is in passive mode.

The loitering mode may be called aircraft loitering mode.

The loitering mode may be defined as flight cruise.

The aircraft loitering mode may be defined as a phase of flight comprising cruising for a certain amount of time over a specific region and may occur at the end of the flight when the aircraft waits for clearance to land or may occur when the aircraft flies over a target for e.g. aerial reconnaissance purpose.

BRIEF DESCRIPTION OF THE DRAWINGS

The present invention will now be described by way of examples with references to the accompanying schematic drawings, of which.

DETAILED DESCRIPTION

Hereinafter, exemplary embodiments of the present invention will be described with reference to the accompanying drawings, wherein for the sake of clarity and understanding of the invention some details of no importance may be deleted from the drawings.

FIGS. 1a-1d show a first exemplary embodiment of an aircraft multirod fluid actuator arrangement, comprising a first 101 and a second (not shown) multirod actuator configured to move a first set of piston rods (a first piston rod 119 is only shown). The aircraft multirod fluid actuator arrangement further comprises a third multirod actuator (not shown) configured to move a second set of piston rods (a second piston rod 121 is only shown). A control unit 120 is configured to control the motion of the first set of piston rods in a first motion mode and to control the motion of the second set of piston rods in a second motion mode. The respective piston rod of the first set of piston rods being coupled to primary control surfaces of an aircraft (not shown). The respective piston rod of the second set of piston rods being coupled to secondary control surfaces of an aircraft (not shown).

Figure 1A:
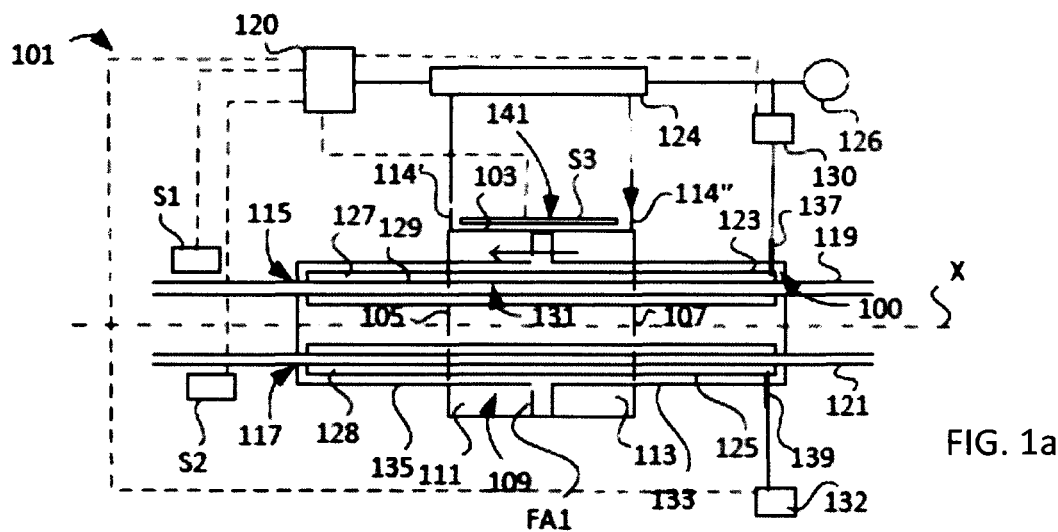
FIGS. 1a-1e illustrate a multirod fluid actuator arrangement according to a first example showing an exemplary principle of operation.

In FIG. 1a is shown the first multirod fluid actuator arrangement 101 comprising a cylinder housing 103 including a first head member 105 and a second head member 107. A piston body 109 is slidable arranged in the cylinder housing 103. The piston body 109 divides the cylinder housing 103 interior into a first cylinder chamber 111 and a second cylinder chamber 113. The first cylinder chamber 111 and the second cylinder chamber 113 are coupled to a fluid supply 126 via fluid ports 114', 114". The piston body 109 exhibits a first through-bore 115 and a second through-bore 117. The first through-bore 115 and the second through-bore 117 each extends through the piston body 109 parallel with an axial direction X extending along the piston body 109 and in separated positions and parallel with each other. A first piston rod 119 is arranged slidable in the first through-bore 115. A second piston rod 121 is arranged slidable in the second through-bore 117.

The first through-bore 115 comprises a first clamping section 116 comprising a first engagement and disengagement device 123. The second through-bore 117 comprises a second clamping section 118 comprising a second engagement and disengagement device 125. The respective first engagement and disengagement device 123 and second engagement and disengagement device 125 each provides an individually engagement or disengagement to or from the respective first piston rod 119 and the second piston rod 121.

The multirod fluid actuator arrangement 101 comprises a valve device arrangement 130, 132 (e.g. comprising one single valve device or at least two valve devices) coupled to the respective first 123 and second 125 engagement and disengagement device. The valve arrangement 130, 132 is also coupled to the fluid supply 126. By means of a control unit 120 coupled to the valve arrangement 130, 132 there is provided that the valve arrangement 130, 132 can be controlled to control the respective first 123 and second 125 engagement and disengagement device in an individually manner for a clamping action and/or a release action respectively.

In such way the respective first engagement and disengagement device 123 and the second engagement and disengagement device 125 can be individually engaged with and disengaged from the respective first 119 and second 121 piston rod. The first engagement and disengagement device 123 comprises a first hollow space 127 coupled to the fluid supply. A first flexible clamping wall 129 of the piston body 109 is defined between the first hollow space 127 and a first inner camping surface 131 of the piston body 109. The first inner clamping surface 131 of the piston body 109 is designed to provide a clamping action on any portion of the envelope surface of the first piston rod 119 upon pressurization of the first hollow space 127.

The pressurization of the first hollow space 127 is controlled by the control unit 120. The pressurization of the first hollow space 127 expands the first flexible clamping wall 129 in a direction radially inwardly. The piston body 109 comprises a first extending sleeve portion 133 that extends in the axial direction X (parallel with the extension of the first and second piston rod respectively) from the cylinder housing 103 interior through the first head member 105. The piston body 109 comprises a second extending sleeve portion 135 that extends in the axial direction X from the cylinder housing 103 interior through the second head member 107. The first hollow space 127 of the first engagement and disengagement device 123 is coupled to the fluid supply 126 via the first extending sleeve portion 133 of the piston body 109 by means of a first fluid coupling 137.

A servo valve 124 is coupled to between the fluid supply 126 and the respective first and second cylinder chamber 111, 113. A first fluid channel 100 extends between the first engagement and disengagement device 123 and the first logic valve 130. The control unit 120 is coupled to the first logic valve 130 for controlling the engagement and disengagement between the piston body 109 and the first piston rod 119. A second hollow space 128 of the second engagement and disengagement device 125 is coupled to the fluid supply 126 via the first extending sleeve portion 133 of the piston body 109 by means of a second fluid coupling 139.

A second logic valve 132, coupled to the control unit 120, is arranged between the second fluid coupling 139 and the fluid supply 126. The first extending sleeve portion 133 extends from a main portion 141 of piston body 109. The main portion 141 forms at least a piston force area FA1 within the cylinder housing 103. The first extending sleeve portion 133 exhibits a smaller diameter than the main portion 141 of the piston body 109. The main portion 141 forms the piston force area FA1 within the cylinder housing 103. The piston force area FA1 exhibits an extension transverse to the axial direction X. The first engagement and disengagement device 123 is coupled to the control valve 124. The control unit 120 is adapted to control said control valve 124. Thereby is achieved that the respective piston rod can be controlled individually to make a specific motion.

Figure 1B:
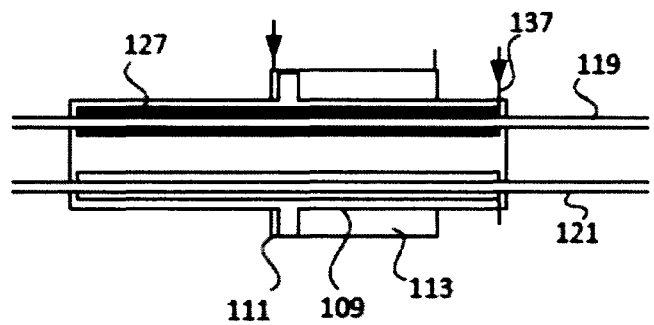

In FIG. 1b is shown the fluid actuator arrangement 101 performing a motion of the first piston rod 119. The control unit, control valve and fluid supply are not shown.

Figure 1C:
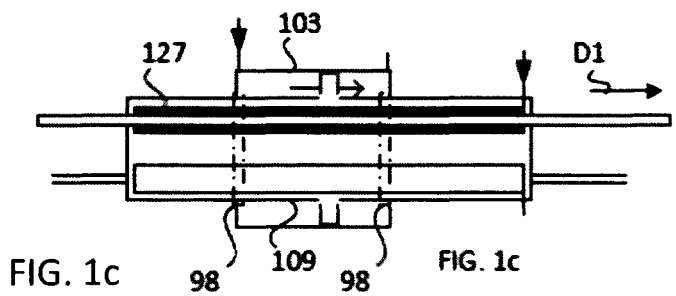

The first cylinder chamber 111 is pressurized with a first pressure for propelling the piston body 109 in a direction D1 along the axial direction as shown in FIG. 1c.

The first hollow space 127 is pressurized with a clamping force pressure via the first fluid coupling 137 for making an engagement between the piston body and 109 and the first piston rod 119, whereby the first piston rod 119 is moved in the direction D1 as shown in FIG. 1c.

Figure 1E:
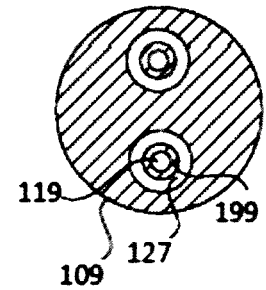
Figure 1D:
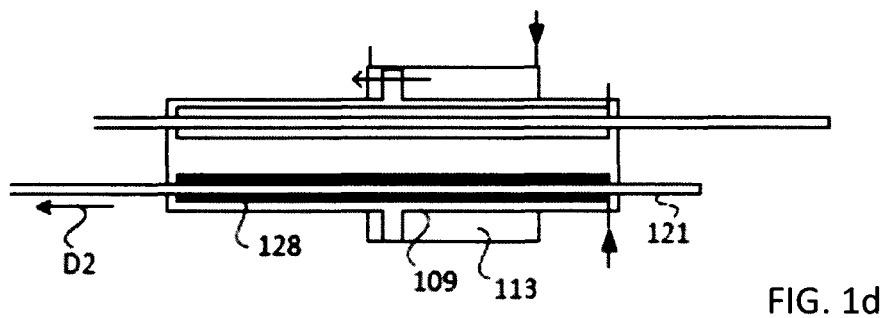

In a next step shown in FIG. 1d, the piston body 109 is moved in the opposite direction by pressurizing the second cylinder chamber 113. The second piston rod 121 is moved in an opposite direction D2 by pressurizing the second hollow space 128. By alternately pressurizing the first 111 and second 113 cylinder chamber in an alternately way there is achieved a first and second stroke (e.g. in a reciprocating motion) of the piston body 109.

By engaging of the piston body 109 to the first piston rod 119 in the first stroke provides an individually controlled motion of the first piston rod 119. By the engaging of the piston body 109 to the second piston rod 121 in the second stroke there is provided an individually controlled motion of the second piston rod 121. It is possible to disengage the piston body 109 from the first piston rod 119 and the second piston rod 121 as shown in FIG. 1a for providing a motion of the piston body 109 disengaged from the first 119 and second 121 piston rod.

Thereby is achieved that each individual piston rod in a set of at least two piston rods 119, 121, can be controlled individually.

Each individual piston rod thus can be driven an optional distance independently of the stroke length of the cylinder housing, without any need of arranging a cylinder for each rod. The control unit 120 is set to control the first logic valve 130 and the second logic valve 132 (see FIG. 1a). The second logic valve 132 is coupled to the second fluid coupling 139 for fluid communication (may be defined as an activating device). The control unit 120 is coupled to the second logic valve 132 for controlling the engagement and disengagement between the piston body 109 and the second piston rod 121.

Furthermore, the control unit 120 is coupled to a first sensor S1 being arranged adjacent the first piston rod 119. The control unit 120 is also coupled to a second sensor S2 being arranged adjacent the second piston rod 121. A third sensor S3 is arranged to the cylinder housing 103 and is coupled to the control unit 120. By means of actual motion/position/acceleration values detected by the first, second and third sensors S1, S2, S3 and executed by the control unit 120, control signals are generated for controlling the valve arrangement 124 and the first 130 and second 132 logic valve for desired motion performance of the respective first and second piston rod 119, 121.

The first, second and third sensor S1, S2, S3 may comprise a position sensor, linear motion sensor, and/or a pressure sensor etc. The fluid actuator arrangement 101 comprises a bearing arrangement 98. The bearing arrangement 98 is arranged between the first cylinder housing 103 and the first piston body 109.

FIG. 1e illustrates a cross-section of the first piston body in a closer view. The first hollow space 127 is arranged around the first piston rod 119. A clamping (expandable) wall portion 199 is defined between the first hollow space 127 and the first piston rod 119 envelope surface.

Clamping at least one piston rod of the first set of piston rods in parked position and holding the respective piston body against the first and second cylinder head and the clamping at least one piston rod of the second set of piston rods in parked position and holding a third piston body (not shown) against the cylinder head being performed in a loitering mode.

Figure 2:
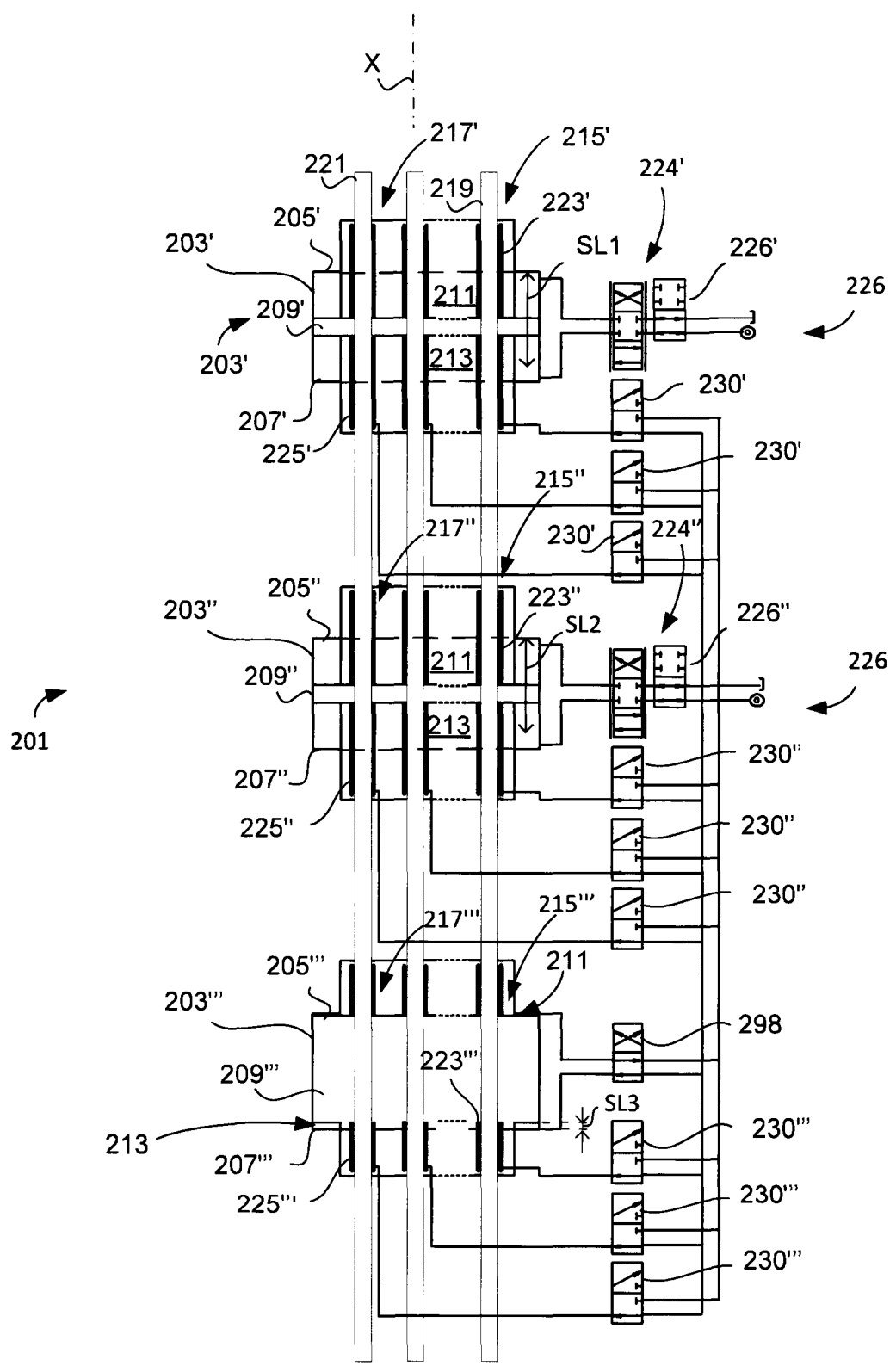
FIG. 2 illustrates a multirod fluid actuator arrangement according to a second example.

FIG. 2 illustrates a multirod fluid actuator arrangement 201 according to a second example. The multirod fluid actuator arrangement 201 comprises a first cylinder housing 203' comprising a first head member 205' and a second head member 207'. A first piston body 209' is slidable arranged in the first cylinder housing 203'. The first piston body 209' divides a first interior of the first cylinder housing 203' into a first cylinder chamber 211 and a second cylinder chamber 213. A second cylinder housing 203" comprises a first head body 205" and a second head body 207". A second piston body 209" is slidable arranged in the second cylinder housing 203". The second piston body 209" divides a second interior of the second cylinder housing 203" into a first chamber 211 and a second chamber 213. The first piston body 109' exhibits a first set of through-bores 215' and a second set of through-bores 217' that extend through the first piston body 209' in an axial direction X.

The second piston body 209" exhibits a third set of through-bores 215" and a fourth set of through-bores 217" that extend through the second piston body 209" in the axial direction X.

A first set of piston rods 219 being arranged slidable through the first set of through-bores 215' and through the third settings of through-bores 215".

A second set of piston rods 221 being arranged slidable through the second set of through-bores 217' and through the fourth set of through-bores 217".

The first set of through-bores 215' comprises a first settings of engagement and disengagement devices 223' and the second set of through-bores 217' comprises a second set of engagement and disengagement devices 225'. The third set of through-bores 215" comprises a third settings of engagement and disengagement devices 223" and the fourth set of through-bores 217" comprises a fourth settings of engagement and disengagement devices 225".

Each piston rod of said first and second set of piston rods 119, 121 being configured to be individually engaged or disengaged by an clamping device of the first, second, third, fourth settings of engagement and disengagement devices 223', 225', 223", 225".

A third cylinder housing 203''' comprises a first head element 205''' and a second head element 207'''. A third piston body 209''' is slidable arranged through the third cylinder housing 203'''. The third piston body 209''' divides a third interior of the third cylinder housing 203''' into a first chamber 211 and a second chamber 213.

The third piston body 209''' exhibits a fifth set of through-bores 215''' and a sixth set of through-bores 217''' that extend through the third piston body 209''' in the axial direction X.

The first set of piston rods 219 is arranged slidable through the fifth of through-bores 215''' and the second settings of piston rods 221 is arranged slidable through the sixth set of through-bores 217'''.

The third piston body comprises a fifth and sixth settings of engagement and disengagement devices 223''', 225'''. Each clamping device of the fifth and sixth settings of engagement and disengagement devices 223''', 225''' is configured to clamp the respective piston rod.

A fluid supply system 226 is provided to fed fluid to the first, second, third cylinder housings and to the engagement and disengagement devices.

The first piston body 209' is configured to engage and move each piston rod of the first and second set of piston rods 219, 221 a first distance corresponding with a first piston stroke length SL1 of the first piston body 209'.

The second piston body 209" is configured to engage and move each piston rod of the first and second set of piston rods 219, 221 a first distance corresponding with a second piston stroke length SL2 of the second piston body 209".

The third piston body 209''' is configured to engage and move each piston rod of the first and second set of piston rods 219, 221 a third distance corresponding with a third piston stroke length SL3 of the third piston body 209'''.

The first and second piston maximum stroke length SL1, SL2 is longer than the third piston maximum stroke length SL3.

The stroke length and/or rate performed by the first piston body may be controlled by a first continuous and adjustable control valve 224', such as a first servo valve.

The stroke length and/or rate performed by the second piston body may be controlled by a second continuous and adjustable control valve 224", such as a second servo valve.

Fluid is fed to the first cylinder housing 203' from the fluid supply system 226 via the first continuous and adjustable control valve 224'. A first on/off logic valve 226' (e.g. puppet valve) is arranged between the fluid supply system 226 and the first continuous and adjustable control valve 224' for leakage free operation.

Fluid is fed to the second cylinder housing 203" from the fluid supply 226 via the second continuous and adjustable control valve 224". A second on/off logic valve 226" (e.g. puppet valve) is arranged between the fluid supply system 226 and the second continuous and adjustable control valve 224" for leakage free operation.

Alternatively, the first 209' and second 209" piston bodies are in parked position in loitering mode.

Alternatively, the first piston body 209' abuts the first head member 205' 207" of the first cylinder housing 203" and the second piston body 209" abuts the second head member 207" of the second cylinder housing 203" for providing the parked position of the piston bodies in loitering mode.

Alternatively, the second 225' and fourth 225" set of engagement and disengagement devices are controlled not to clamp around the second set of piston rods 221 in loitering mode.

Alternatively, the first 223' and third 223" set of engagement and disengagement devices are controlled to clamp around the first set of piston rods 219 in loitering mode.

The first and second continuous and adjustable control valve 224',224" may be controlled by a control unit (not shown) configured to control the motions of the first and second piston bodies 209' 209" in regard to a control loop and feedback sensor devices (not shown).

Each engagement and disengagement device 223', 223", 223''', 225', 225", 225''' is coupled to the fluid supply 226 via a respective first set, second set, third set of logic valve devices 230',230",230''' configured to provide flow of fluid to the respective engagement and disengagement device.

The control unit may be coupled to each logic valve device for controlling the engagement and disengagement of the respective first, second, third piston body to or from the first set of piston rods respective the second set of piston rods by means of the respective engagement and disengagement device.

The coupling between the different devices and hydraulic components of the arrangement is achieved by hydraulic lines configured for fluid communication.

Alternatively, a fluid accumulator tank member (not shown) of the fluid supply 226 may support fluid to the respective engagement and disengagement device 223', 223", 223''', 225', 225", 225''' for clamping action and support fluid to the second and third cylinder housing 203",203''' for building up pressure for keeping the respective second and third piston body 209",209''' in parked position against the respective cylinder head and closing the logic directional valve 298 so that the third piston body 209''' is kept in parked position by the built up pressure.

Alternatively, the second piston body 209" is pressurized by the fluid accumulator tank member and second on/off valve 226" closed. Also the first piston body 209' of the first cylinder housing 203' is in parked position by pressurization of the first piston body 209' by means of the fluid supply 226 towards a cylinder head of the first cylinder housing 203'.

Thereby is achieved that the aircraft can fly in the loitering mode in an energy saving way. The fluid accumulator tank member is dimensioned to be able to feed the arrangement with fluid in the loitering mode and providing sufficient time to start the motor and fluid pump.

Alternatively, a logic directional valve 298 is arranged between the fluid supply 226 and the third cylinder housing 203''' for controlling the third piston body to move between the cylinder heads.

In such way the leakage is eliminated, still achieving small adjustments of the secondary control surface which may be needed during the loitering mode.

Alternatively, small adjustments of the aircraft secondary control surface is made by activating the logic directional valve 298 and moving the third piston body 209''' together with actual piston rod of the second set of piston rods at the same time as the engagement and disengagement device holding the actual piston rod is released.

Figure 3:
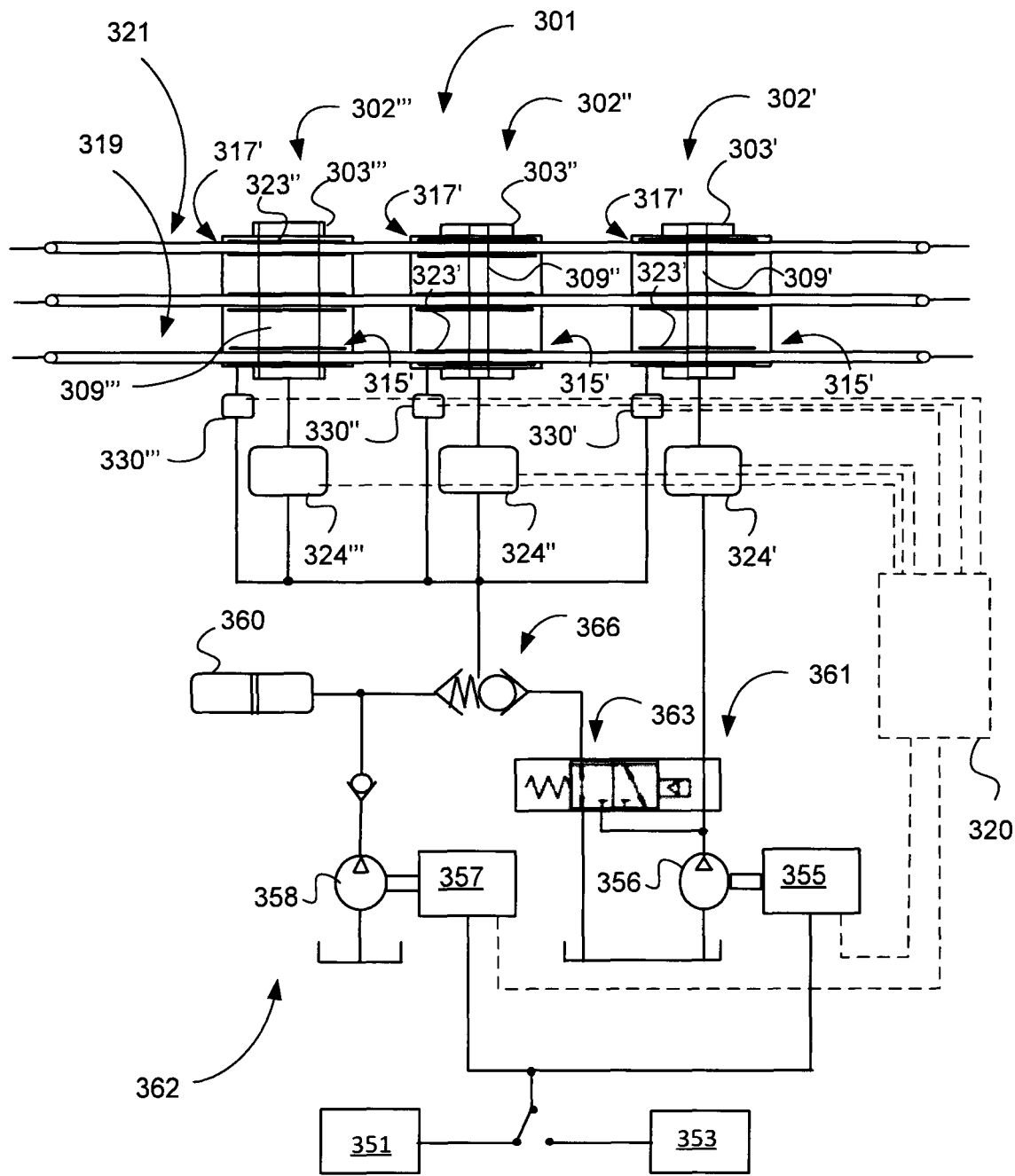
FIG. 3 illustrates a multirod fluid actuator arrangement according to a third example.

FIG. 3 illustrates an aircraft control surface multirod fluid actuator arrangement 301 according to a third example.

In this example, the aircraft control surface multirod actuator arrangement comprises a first 302' and a second 302" multirod actuator configured to move a first set of piston rods 319 (only one piston rod is shown). A third multirod actuator 302''' is configured to move a second set of piston rods 321 (only one piston rod is shown).

A control unit 320 of the an aircraft control surface multirod fluid actuator arrangement is configured to control the motion of the first set of piston rods 319 in a first motion mode and to control the motion of the second set of piston rods 321 in a second motion mode.

The first set of piston rods 319 is coupled to primary control surfaces of an aircraft.

The second set of piston rods 321 is coupled to secondary control surfaces of the aircraft.

Each multirod actuator 302',302",302''' comprises a cylinder housing 303',303",303''', a piston body 309',309", 309''', a first 315' and second 317' set of through bores of the respective piston body, through which first set 315' of through bores is arranged the first set 319 of piston rods and through which second set 317' of through bores is arranged a second set 321 of piston rods.

The respective through bore is provided with a respective clamping device for clamping and moving the respective piston rod together with the piston body.

A first set of clamping devices 323' associated with the first set of piston rods 319 (e.g. coupled to the primary control surfaces of the aircraft) is configured for individually engagement with each piston rod of the first set of piston rods.

A second set of clamping devices 323" associated with the second set of piston rods 321 (e.g. coupled to the secondary control surfaces of the aircraft) is configured for individually engagement with each of the piston rods of the second set of piston rods.

The first and second multirod actuator 302',302" are configured as primary surface (e.g. aileron, elevator) actuator unit. The third multirod actuator 302''' is configured as a secondary surface (e.g. trim surface) actuator.

An aircraft battery 351 or an engine driven generator 353 optionally being coupled to a first and second motor 355, 357. The first motor 355 is coupled to a first fluid pump 356 for generating a first fluid pressure of a first fluid supply system 361. The second motor 357 is coupled to a second fluid pump 358 for generating a second fluid pressure of a second fluid supply system 362. The first fluid pump 356 is coupled to a first cylinder housing 303' via a first continuous and adjustable control valve 324' configured to be controlled by the control unit 320 to move a first piston body 309'.

Alternatively, the first fluid supply system may operate independently from the second fluid supply system.

Alternatively, the first fluid pressure may be equal to the second fluid pressure.

The second fluid pump 358 is coupled to a second cylinder housing 303" via a second continuous and adjustable control valve 324" configured to be controlled by the control unit 320 to move a second piston body 309"'.

Alternatively, the second fluid pump 358 is also coupled to a third cylinder housing 303''' via a third directional valve 324''' configured to be controlled by the control unit 320 to move a third piston body 309''' forward and backward between end positions in the third cylinder housing against its first and second cylinder heads.

Each clamping device of the first, second and third multirod actuator 302',302",302''' is coupled to the second fluid pump 358 via a respective logic valve for providing a clamping around the respective piston rod.

Each clamping device is coupled to the first fluid supply system 362 via a respective first set, second set, third set of logic valve devices 330',330",330''' configured to provide flow of fluid to the respective clamping device.

The second fluid pump 358 may also be coupled to a fluid accumulator tank member 360.

The first motion mode may constitutes the start/landing/climb/turn mode of the aircraft. In the first motion mode, the third piston body 309''' is parked in a parking position against a head of the third cylinder housing 303''', wherein the clamping devices of the second set of piston rods. In the first motion mode, the piston rods of the first set of piston rods are individually moved by the respective first and second multirod actuator 302',302" cooperating alternately for continuously motion.

The second motion mode may constitutes the loitering mode of the aircraft, in which mode the aircraft only requires small control surface movement for flight control through the air (e.g. trim control surface motion in loitering mode), the second motor and second fluid pump also being configured to generate the second fluid pressure for pressurizing the fluid accumulator tank member 360, e.g. intermittent, 2-3 seconds every 5-10 minute period when the aircraft flies in loitering mode.

The aircraft loitering mode may be defined as a phase of flight comprising cruising for a certain amount of time over a specific region and may occur at the end of the flight when the aircraft waits for clearance to land or may occur when the aircraft flies over a target for e.g. aerial reconnaissance purpose.

The aircraft control surface multirod fluid actuator arrangement 301 may be configured for redundancy. Wherein the first fluid supply system 361 may comprise a redirectional valve 363 which is controlled by the control unit 360 to redirect the fluid flow from the first fluid supply system 361 to the second fluid supply system 362 in case of malfunction of the second fluid supply system 361.

A check valve 366 is coupled between the redirectional valve 363 and the second fluid supply system 362.

In case of malfunction of the first fluid supply system 361, the second fluid supply system 362 will provide flow of fluid to the second and third multirod actuator 302",302''', which are controlled by the control unit 360 to propel the first and second set of piston rods 319, 321 in an intermittent way.

Figure 4:
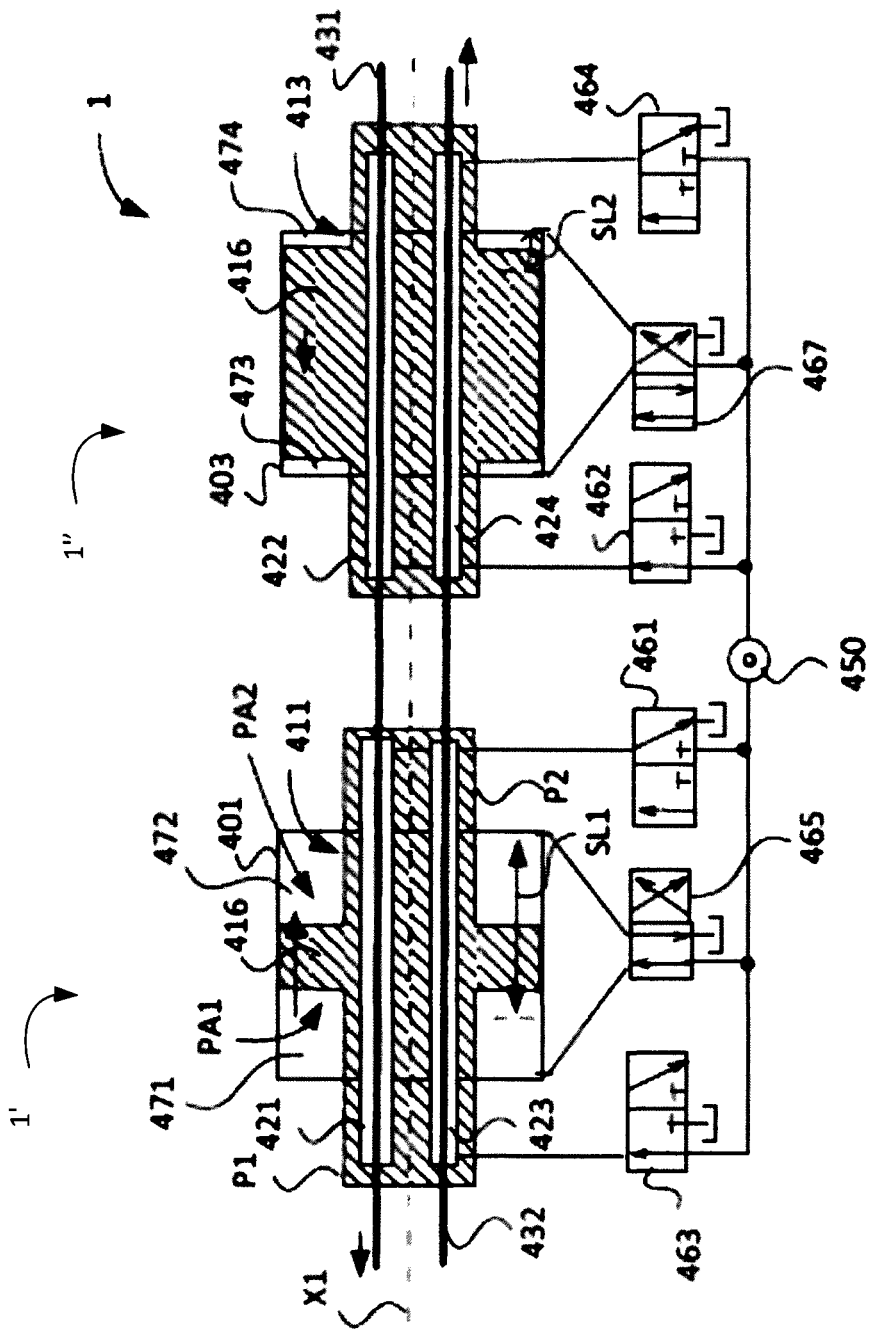
FIG. 4 illustrates a multirod fluid actuator arrangement according to a fourth example.

FIG. 4 illustrates am aircraft fluid actuator arrangement 1 according to a fourth example.

The aircraft multirod fluid actuator arrangement 1 comprises a first and a second multirod actuator 1',1" configured to move a first set of piston rods (a first piston rod 431 is only shown). The aircraft multirod fluid actuator arrangement 1 further comprises a third multirod actuator (not shown) configured to move a second set of piston rods (a second piston rod 432 is only shown). A control unit (not shown) is configured to control the motion of the first set of piston rods in a first motion mode and to control the motion of the second set of piston rods in a second motion mode. The respective piston rod of the first set of piston rods being coupled to primary control surfaces of an aircraft (not shown). The respective piston rod of the second set of piston rods being coupled to secondary control surfaces of an aircraft (not shown).

The fluid actuator arrangement 1 comprising a first cylinder housing 401 and a second cylinder housing 403. It further comprises a first piston 411 comprising a first clamping device 421. The first piston 411 is arranged movable in the first cylinder housing 401 in a first axial direction X1. A second piston 413 comprises a second clamping device 422. The second piston 413 is arranged movable in the second cylinder housing 403 in the first axial direction X1. A first piston rod 431 extends through the first clamping device 421 and through the second clamping device 422. The first piston 411 is configured to clamp and move the first piston rod 431 a first distance corresponding with a first piston stroke length SL1 that the first piston 411 is configured to perform in the first cylinder housing 401. The second piston 413 is configured to clamp and move the first piston rod 431 a second distance corresponding with a second piston stroke length SL2 that the second piston 413 is configured to perform in the second cylinder housing 403. The first piston stroke length SL1 is longer than the second piston stroke length SL2.

The first piston 411 is formed with a first projection P1 extending in X-direction from a first effective piston area PA1 of a first piston body 416, which is formed of a mid-section of the first piston 411 and which has a larger diameter than the first projection P1. The first piston 411 is formed with a second projection P2 extending in X-direction from a second effective piston area PA2 of the first piston body 416. The respective first and second projection being cylindrical shaped and being co-axially arranged to the first piston body 416 and having a smaller diameter than that of the first piston body 416, which is slidably arranged in the first cylinder housing 401. The first piston 411 further comprises a third clamping device 423 and the second piston 413 comprises a fourth clamping device 424. A second piston rod 432 extends through the third clamping device 423 and through the fourth clamping device 424.

Each clamping device 421, 422, 423 and 424 being coupled to a fluid supply 450 via a respective on/off hydraulic valve 461, 462, 463 and 464. A first 471 and a second 472 cylinder housing chamber of the first cylinder housing 401 being coupled to the fluid supply 450 via a first direction valve 465 (may be a first continuous and adjustable control valve). A third 473 and a fourth 474 cylinder housing chamber of the second cylinder housing 403 being coupled to the fluid supply 450 via a second direction valve 467 (may be a second continuous and adjustable control valve). The first piston stroke length SL1 that the first piston 411 is configured to perform is selectively provided for achievement of a feeding mode (Discrete Feeding Mode) and the second piston stroke length SL2 that the second piston 413 is configured to perform is selectively provided for achievement of a fine tuning mode. The feeding mode and/or the fine tuning mode being selectively selected by a control circuit (not shown) coupled to the respective on/off hydraulic valve 461, 462, 463 and 464 and coupled to the respective first and second direction valve 465, 467.

The fluid actuator arrangement comprises an end position cushioning member (not shown) configured for controlled deceleration of the stroke velocity in both end positions of the respective first 401 and second 403 cylinder housing.

Figure 5:
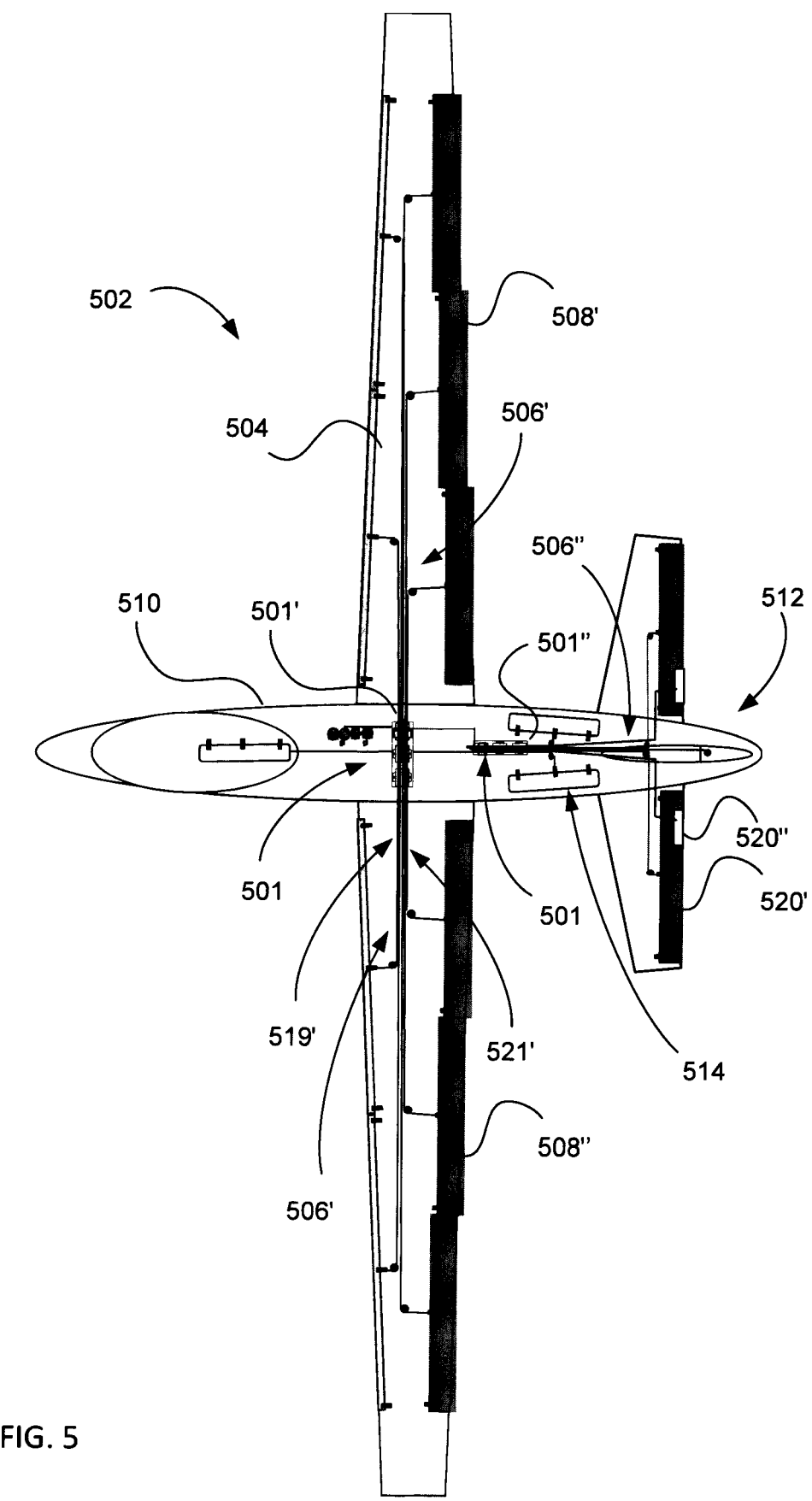
FIG. 5 illustrates an aircraft comprising a multirod fluid actuator arrangement according to a fifth example.

FIG. 5 illustrates an aircraft 502 comprising an aircraft control surface multirod fluid actuator arrangement 501 according to a fifth example. The aircraft control surface multirod fluid actuator arrangement 501 comprises two individual aircraft control surface multirod actuators 501', 501". The first aircraft control surface multirod actuator 501' is positioned in the fuselage 510 of the aircraft 502 and is configured to move primary and secondary control surfaces in the wing 504 of the aircraft 502. A first plurality of piston rods 519',521' of the first aircraft control surface multirod actuator 501' is coupled to a first wire arrangement 506' in turn coupled to the respective first and second control surface 508',508".

The second aircraft control surface multirod actuator 501" is also positioned in the fuselage 510 of the aircraft 502 and is configured to move primary and secondary control surfaces in the tail 512 of the aircraft and is furthermore coupled to a landing gear retraction mechanism 514. A second plurality of piston rods of the second aircraft control surface multirod actuator 501" is coupled to a second wire arrangement 506" in turn coupled to the respective first 520' (empennage) and second 520" (empennage trim surfaces) control surface.

Figure 6A:
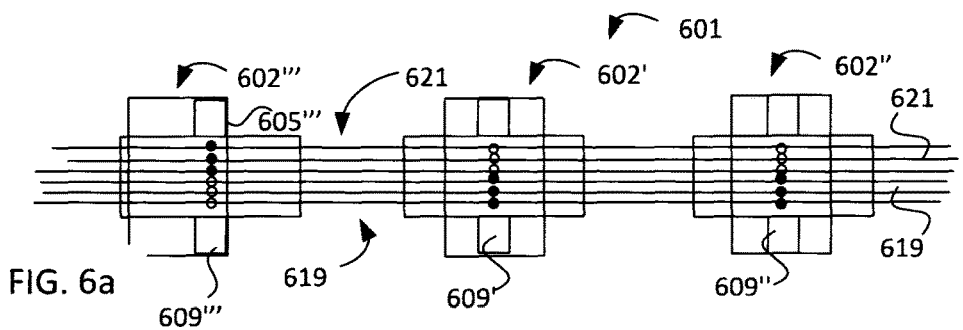
FIGS. 6a-6c illustrate a multirod fluid actuator arrangement according to a sixth example showing an exemplary principle of operation.
Figure 6B:
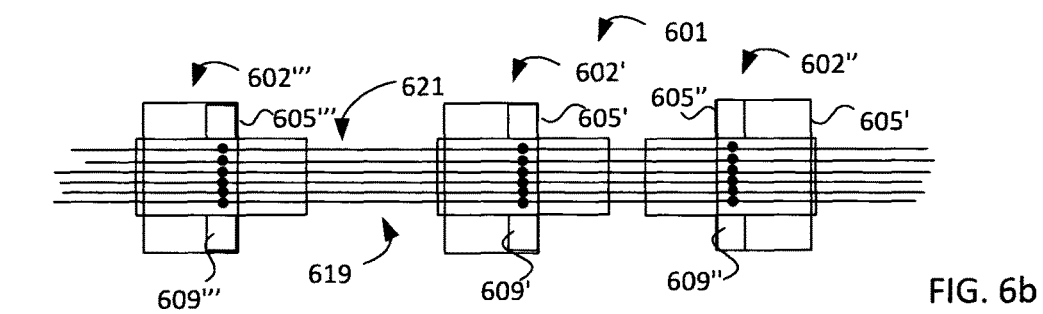
Figure 6C:
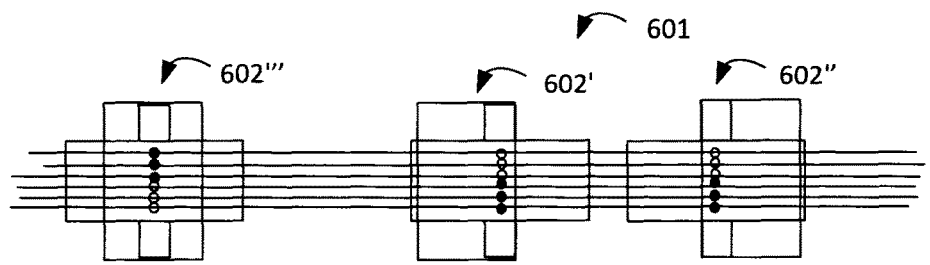

FIGS. 6a-6c illustrate an aircraft multirod fluid actuator arrangement 601 according to a sixth example showing an exemplary principle of operation. The aircraft multirod fluid actuator arrangement 601 comprises a first 602' and a second 602" multirod actuator configured to move a first set of piston rods 619. The first multirod actuator 602' comprises a first piston body 609'. The second multirod actuator 602" comprises a second piston body 609". A third multirod actuator 603'" of the aircraft multirod fluid actuator arrangement 601 is configured to move a second set of piston rods 621 and comprises a third piston body 609'". The first set of piston rods 619 is coupled to primary control surfaces (e.g. aileron, elevator, rudder) of an aircraft (not shown). The second set of piston rods 621 is coupled to secondary (e.g. trim) control surfaces of an aircraft (not shown).

A control unit (not shown) is configured to control the motion of the first set of piston rods 619 in a first motion mode and to control the motion of the second set of piston rods 621 in a second motion mode.

The control unit is furthermore configured in a third motion mode to control the motion of the first set of piston rods 619 when the second set of piston rods 621 is in parked position and to control the motion of the second set of piston rods 621 when the first set of piston rods 619 is in parked position.

The control unit is furthermore configured in a non-motion mode to lock (clamp) the first 619 and second 621 set of piston rods.

FIG. 6a shows a start/landing/climb/turn mode (first motion mode and/or combined with the third motion mode) wherein the secondary control surfaces are locked by locking (parking) the second set of piston rods 621 and wherein the primary control surfaces are moved by the first set of piston rods 619. The second set of piston rods 621 are clamped by the third piston body 609'" of the third multirod actuator 602'", which third piston body 609'" is parked against a head inner wall 605'" of the third multirod actuator 602'".

FIG. 6b shows a loitering mode (non-motion mode) wherein the second set of piston rods 621 is clamped by the third piston body 609'" of the third multirod actuator 602'", which third piston body 609'" is parked against the head inner wall 605'" of the third multirod actuator 602'".

The first set of piston rods 619 are clamped by the first 609' and second 609" piston body of the respective first 602' and second 602" multirod actuator. The first piston body 609' is parked against a head inner wall 605' of the first multirod actuator. The second piston body 609" is parked against a head inner wall 605" of the second multirod actuator.

Alternatively, an motor-fluid pump arrangement (not shown) configured for directly feeding fluid to the first, second and third multirod actuator is shut off for saving energy during the loitering mode, whereas for moving trim control surfaces of the aircraft, a fluid accumulator tank member is utilized for providing pressurized fluid to the third multirod actuator 602''' and to the clamping devices of the respective piston body, 609',609'',609'''.

FIG. 6c shows a loitering mode, but the aircraft being trimmed for making minor adjustments for proper movement of the aircraft.

Alternatively, during the loitering mode, a pressurized fluid accumulator tank member (not shown in FIG. 6b but as an example shown in FIG. 3) is utilized for moving the secondary control surfaces in case of small adjustments of the motion of the aircraft.

Alternatively, the motor-fluid pump arrangement and/or fluid pump coupled to the first multirod actuator is shut off for saving energy during the loitering mode in which minor trim adjustment must be done. In such way energy is saved during the loitering mode.

TABLE 1

|  | Secondary control (e.g trim) cylinder | Primary control (e.g aileron) cylinders |
| --- | --- | --- |
| Start-/Land-/Climb-/Turn-mode | Parked piston | Motion |
| Loitering-mode | Parked piston | Parked pistons |
| Loitering-mode and Trim-mode | Motion | Parked pistons |

The table 1 above shows the different modes that may be actual. The saved energy may instead be used for driving surveillance apparatuses, communication devices, and other electrical systems of the aircraft.

Figure 7:
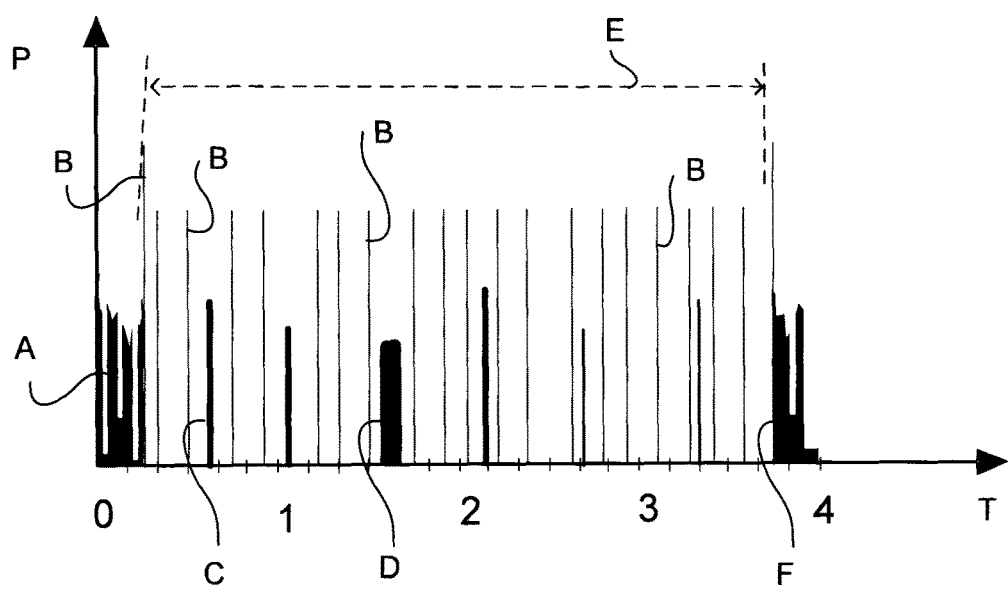
FIG. 7 illustrates exemplary electrical power usage of a multirod fluid actuator arrangement according to a seventh example.

FIG. 7 illustrates exemplary electrical power usage of an aircraft multirod fluid actuator arrangement according to a seventh example. The graph in FIG. 7 shows the use of electrical power P over time T.

When the aircraft starts and climb (marked with A) to desired flight level the first and the second multirod actuator are pressurized for motion of the first set of piston rods. A fluid accumulator tank member of the aircraft multirod fluid actuator arrangement is re-charged (marked with B) by means of a first motor-fluid pump system.

The first motor-fluid pump system may be coupled to the third multirod actuator configured to move the second set of piston rods and lock the first set of piston rods.

The first motor-fluid pump system may be a system an motor-fluid pump arrangement of the aircraft multirod fluid actuator arrangement.

The aircraft makes a turn, which is marked with C.

At a specific point of flight, the aircraft enters turbulence and the flight control system of the aircraft is activated for keeping the aircraft upright and balanced by proper manoeuvring (marked with D).

The aircraft is in a loitering mode (marked with E) and very little energy is used.

At the end of four hours mission, the aircraft lands which is marked with F.

Figure 8A:
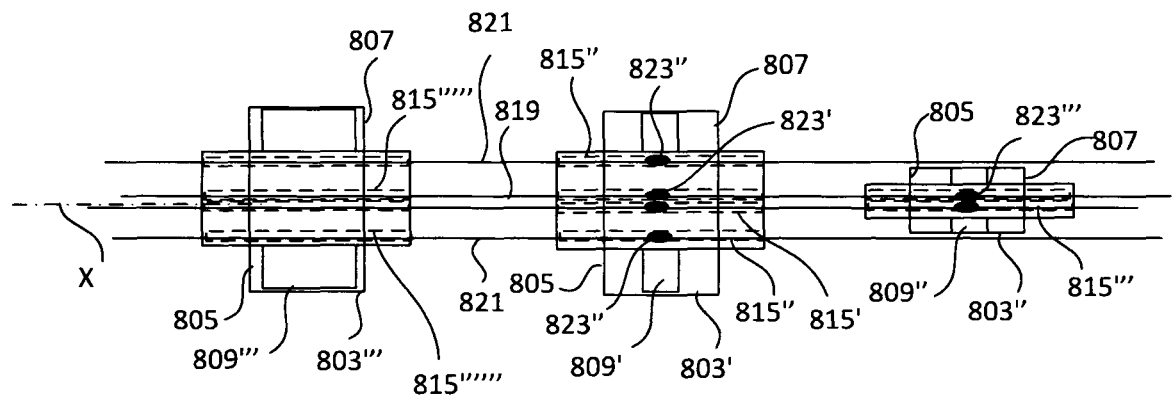
FIGS. 8a-8b illustrate exemplary multirod fluid actuator arrangements according to an eight and ninth example.
Figure 8B:
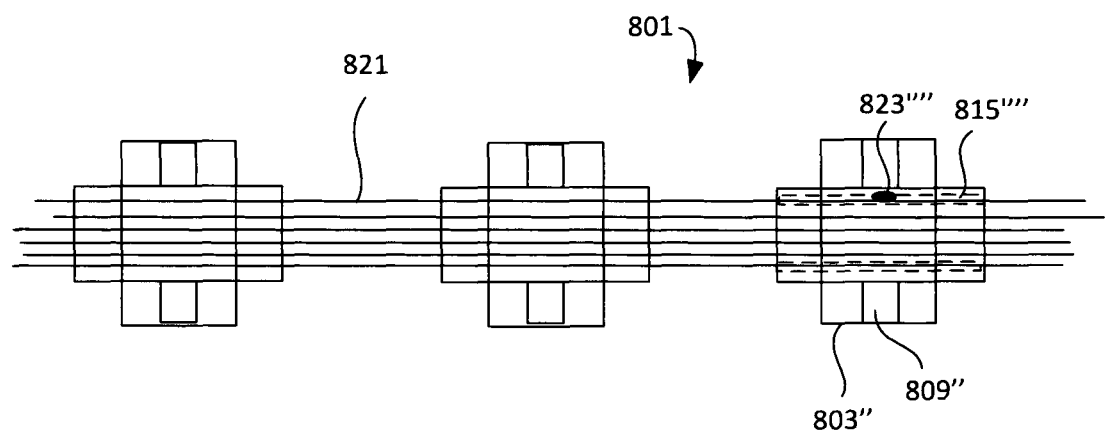

FIGS. 8a-8b illustrate exemplary multirod fluid actuator arrangements according to an eighth and ninth example.

FIG. 8a shows an exemplary multirod fluid actuator arrangement 801 comprising a first cylinder housing 803' comprising a first and a second head member 805, 807. A first piston body 809' is slidable arranged in the first cylinder housing 803'. A second cylinder housing 803'' comprising a first and second head body 805, 807. A second piston body 809'' is slidable arranged in the second cylinder housing 803''. The first piston body 809' exhibits a first set of through-bores 815' and a second set of through-bores 815'' that extend through the first piston body 809' in an axial direction X.

The second piston body 809'' exhibits a third set of through-bores 815''' that extend through the second piston body 809'' in the axial direction X.

A first set of piston rods 819 is arranged slidable in the first and third set of through-bores 815',815'''.

A second set of piston rods 821 arranged slidable in the second set of through-bores 815'' and extend past the second cylinder housing.

The first set of through-bores 815' comprises a first set of engagement and disengagement devices 823' and the second set of through-bores 815'' comprises a second set of engagement and disengagement devices 823''.

The third set of through-bores 815''' comprises a third set of engagement and disengagement devices 823'''.

Each piston rod of said first and second set of piston rods 819, 821 being configured to be individually engaged or disengaged by a clamping device of the first 823', second 823'' or third 823''' set of clamping devices.

A third cylinder housing 803''' comprises a first and second head element 805, 807. A third piston body 809''' is slidable arranged in the third cylinder housing 803'''.

The third piston body 809''' exhibits a fifth and sixth set of through-bores 815'''', 815''''' that extend through the third piston body 809''' in the axial direction X and the first set of piston rods 819 is arranged slidable in the fifth set of through-bores 815'''' and the second set of piston rods 821 is arranged slidable in the sixth set of through-bores 815'''''.

The first piston body 809' is configured to separately engage and move each piston rod of the first and second set of piston rods 819, 821 a first distance corresponding with a first piston stroke length of the first piston body 809'.

The second piston body 809'' is configured to separately engage and move each piston rod of the first set of piston rods 819 a second distance corresponding with a second piston stroke length of the second piston body 809''.

The third piston body 809''' is configured to separately engage and move each piston rod of the first and second set of piston rods 819, 821 a third distance corresponding with a third piston stroke length of the third piston body 809'''; wherein the first and second piston stroke length is longer than the third piston stroke length.

The stroke length of the third piston body 809''' may be used for secondary control surfaces of an aircraft, such as trim surfaces.

The first piston body 809' and the second piston body 809'' can be locked and parked in a direction towards each other so that no play occur.

For such locking of the first piston body 809' and the second piston body 809'' a rechargeable fluid accumulator tank member is used, which also is used for short motion of the third piston body 809''' and its clamping action for making a short third piston stroke length.

This procedure can be used in a loitering mode and requires almost no hydraulic fluid pressure for achieving small adjustments of the movement of the aircraft. An electric pump and fluid pump can be shut off for saving energy during the loitering mode.

FIG. 8b shows an exemplary aircraft multirod fluid actuator arrangement 801 similar to that shown in FIG. 8a, The multirod fluid actuator arrangement 801 in FIG. 8b comprises a second cylinder housing 803'' comprising a second piston body 809''. The second piston body 809'' comprises a fourth set of through-bores 815''', through which the second set of piston rods 821 is arranged.

Figure 9A:
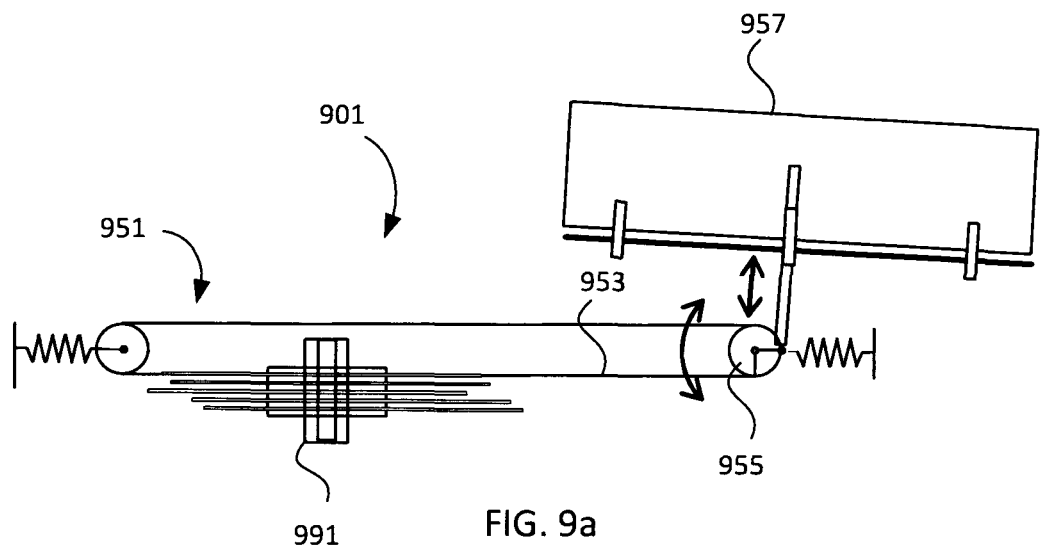
FIGS. 9a-9b illustrate exemplary multirod fluid actuator arrangements according to a tenth and eleventh example.
Figure 9B:
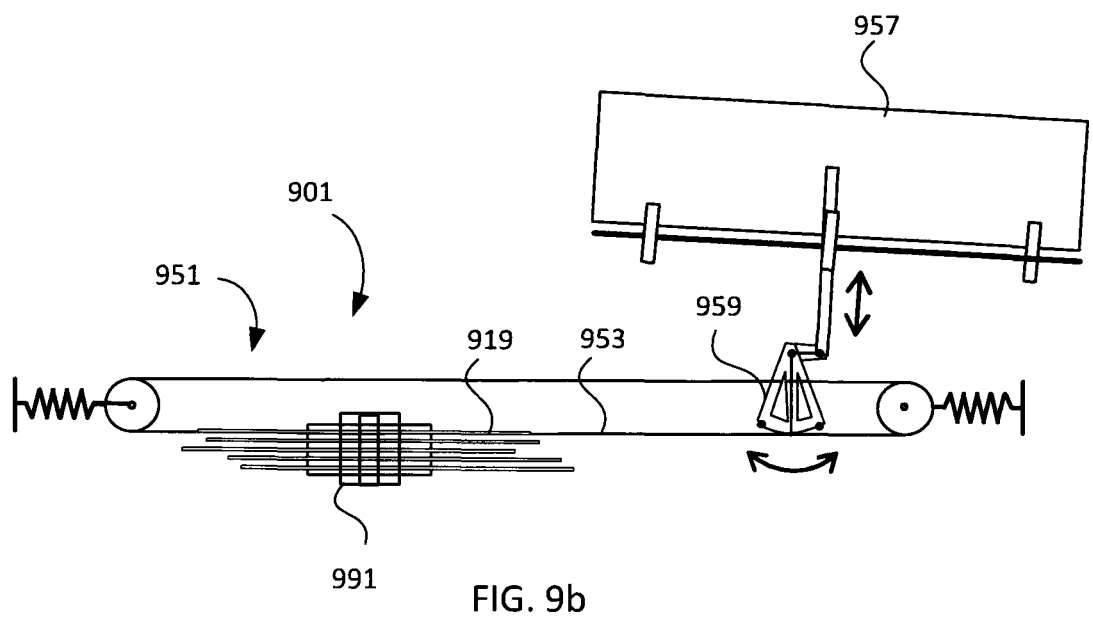

FIGS. 9a-9b illustrate parts of exemplary aircraft multirod fluid actuator arrangements according to a tenth and eleventh example.

FIG. 9a shows an aircraft multirod fluid actuator arrangement 901, of which a first multirod actuator 991 is shown. Each piston rod 919 of the aircraft multirod fluid actuator arrangement 901 is coupled to a wire arrangement 951 (only one wire is shown). Each wire arrangement 951 comprises a wire 953 coupled to the piston rod 919. The wire 953 may run around two pulleys, which are biased for providing sufficient tension in the wire 953. A control surface 957 of an aircraft (not shown) is coupled to one of the pulleys 955 and operates as a lever arm when the pulley 955 is rotated by means of the motion of the piston rod 919 for pivoting the control surface 957.

Such wire arrangement positioned in the wing of an aircraft and the aircraft multirod fluid actuator arrangement 901 positioned promotes for easy handling when assembly and reassembly of the fuselage and the wing and no fluid supply lines have to be drawn between the fuselage and the wing.

The positioning of the aircraft multirod fluid actuator arrangement 901 in the fuselage promotes for a thin wing which in turn promotes for low drag which is energy saving.

The low energy consumption of the aircraft multirod fluid actuator arrangement 901 of the aircraft during a loitering mode will imply that no significant heat is generated from the aircraft.

FIG. 9b shows an aircraft multirod fluid actuator arrangement 901, of which a first multirod actuator 991 is shown. Each piston rod 919 of the aircraft multirod fluid actuator arrangement 901 is coupled to a wire arrangement 951 (only one wire is shown). Each wire arrangement 951 comprises a wire 953 coupled to the piston rod 919. The wire 953 may run around two pulleys, which are biased for providing sufficient tension in the wire 953. The control surface 957 is coupled to a bellcrank member 959, which in turn is coupled to the wire 953.

The wire may be made of steel or may be replaced by a dynema cord.

There is a way to decrease the diameter of the aircraft multirod fluid actuator arrangement so that it is less wide.

According to a first example, if the effective piston area (the area of the piston affected by the fluid pressure) is selected in regard to fluid pressure so that the force of an multirod actuator is 3 kN, and the wire arrangement is coupled to a lever arm exhibiting a length of 0, 1 m (in turn coupled to the control surface), this will result in a moment M of 300 Nm. The multirod actuator stroke length is in this case 0, 1 m.

Furthermore, according to a second example, if the effective piston area is selected in regard to fluid pressure so that the force of another multirod actuator is 1 kN, and the wire arrangement is coupled to a lever arm exhibiting a length of 0, 3 m, this will result in a moment M of 300 Nm. The multirod actuator stroke length is in this case 0, 3 m.

In the first example, the multirod actuator will exhibit larger effective piston area than that of the exemplified second actuator for providing the needed larger force. The stroke length is changed in the second example without changing torque and stiffness by changing the lever length and providing that a longer lever length. Such longer lever length will mean that less force is required, which in turn promotes for a lesser effective piston area resulting in a more slender exemplified first actuator.

Figure 10A:
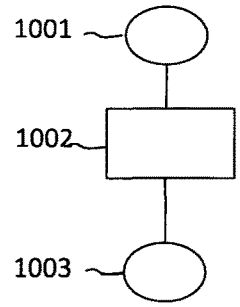
FIGS. 10a-10b illustrate flowcharts showing exemplary methods according to different aspects of a multirod fluid actuator arrangement.
Figure 10B:
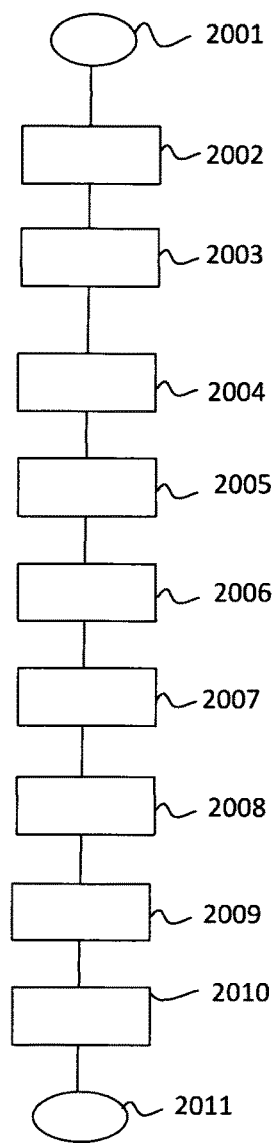

FIGS. 10a-10b illustrate flowcharts showing exemplary methods according to different aspects of a multirod fluid actuator arrangement.

FIG. 10a shows an exemplary method for controlling an aircraft control surface multirod actuator system. The aircraft control surface multirod actuator system comprises; a first and a second multirod actuator configured to move or clamp around a first set of piston rods; a third multirod actuator configured to move or clamp around a second set of piston rods; a control unit configured to control the motion of the first set of piston rods in a first motion mode and to control the motion of the second set of piston rods in a second motion mode.

The method comprises a first step 1001 starting the method. A second step 1002 shows the performance of the method. A third step 1003 comprises stopping of the method.

The second step 1002 may comprise; moving at least one piston rod of the first set of piston rods and/or clamping in parked position at least one piston rod of the second set of piston rods; clamping in parked position at least one piston rod of the first set of piston rods and clamping in parked position at least one piston rod of the second set of piston rods; and clamping in parked position at least one piston rod of the first set of piston rods and moving at least one piston rod of the second set of piston rods.

FIG. 10b shows an exemplary method for controlling an aircraft control surface multirod actuator system. A first step 2001 starting the method. A second step 2002 comprises moving the first set of piston rods and clamping in parked position the second set of piston rods. A third step 2003 comprises clamping in parked position the first set of piston rods and clamping in parked position the second set of piston rods. A fourth step 2004 comprises clamping in parked position the first set of piston rods and moving the second set of piston rods.

Furthermore, there are other exemplary methods. The aircraft control surface multirod actuator system may also comprise a fluid supply comprising a first fluid supply system that comprises a first motor coupled to a first fluid pump, and a second fluid supply system that comprises a fluid accumulator tank member and/or a second motor coupled to a second fluid pump. The method comprises moving the first set of piston rods being achieved by pressurizing a first and second set of clamping devices of the first respective second multirod actuator also being pressurized for moving the first set of piston rods by means of the first fluid supply system and/or the second fluid supply system.

The method may comprise a fifth step 2005 for clamping the second set of piston rods being achieved by pressurizing a third set of clamping devices of the third multirod actuator also being pressurized in parked position by means of the fluid accumulator tank member and/or a second motor coupled to a second fluid pump of the second fluid supply system. The method may comprise a sixth step 2006 for clamping the first set of piston rods being achieved by pressurizing the first and second set of clamping devices of the first respective second multirod actuator, and also in parked position, by means of the second fluid supply system.

The method may comprise a seventh step 2007 for moving the second set of piston rods being achieved by pressurizing the third set of clamping devices and also pressurizing the third multirod actuator for moving the second set of piston rods by means of the second fluid supply system.

The method m ay comprise an eight step 2008 of shutting off the first fluid supply system and a ninth step 2009 wherein the clamping of at least one piston rod of the first set of piston rods in parked position and the clamping of at least one piston rod of the second set of piston rods in parked position being a loitering mode.

The method may comprise a tenth step 2010 of clamping in parked position at least one piston rod of the first set of piston rods and moving at least one piston rod of the second set of piston rods being a loitering mode and trim mode.

The method may comprise a further step of pressurizing the clamping devices and cylinder houses is achieved by feeding fluid from a fluid accumulator tank member to the first, second and third multirod actuator.

In a step 2011 the method is stopped.

Figure 11:
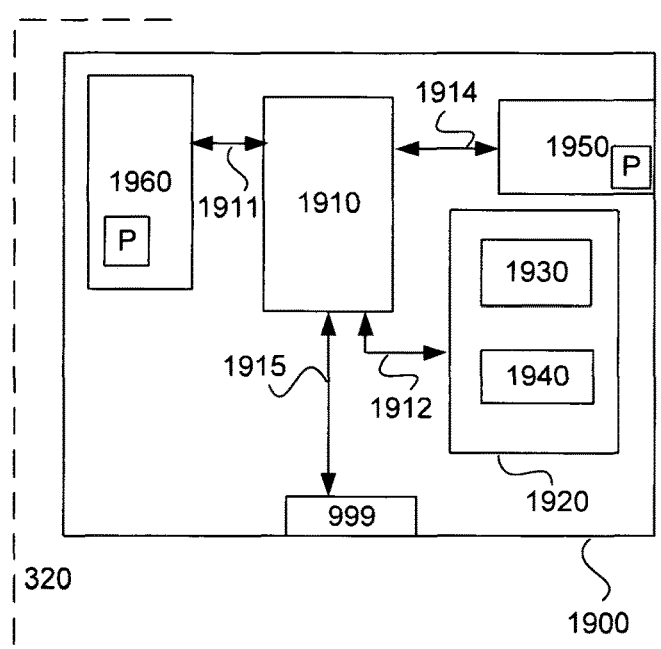
FIG. 11 illustrates a control unit of an exemplary multirod fluid actuator arrangement.

FIG. 11 illustrates a control unit of an exemplary multirod fluid actuator arrangement. The control unit 120 may be used in a multirod fluid actuator arrangement. The control unit is configured to control the linear motion of the piston rods. The control unit 120 comprises a computer. The control unit 120 comprises a non-volatile memory NVM 1920, which is a computer memory that can retain stored information even when the computer is not powered.

The control unit 120 further comprises a processing unit 1910 and a read/write memory 1950. The NVM 1920 comprises a first memory unit 1930. A computer program (which can be of any type suitable for any operational data) is stored in the first memory unit 1930 for controlling the functionality of the control unit 120. Furthermore, the control unit 120 comprises a bus controller (not shown), a serial communication left (not shown) providing a physical interface, through which information transfers separately in two directions.

The Control unit 120 may comprise any suitable type of I/O module (not shown) providing input/output signal transfer, an ND converter (not shown) for converting continuously varying signals from detectors (not shown) of the multirod fluid actuator arrangement and from other monitoring units (not shown) for detecting the positions of each piston rod and the piston bodies, into binary code suitable for the computer.

Other operational data may be actual loads, piston rod velocity etc.

The control unit 120 also comprises an input/output unit (not shown) for adaptation to time and date. The control unit 120 comprises an event counter (not shown) for counting the number of event multiples that occur from independent events in operation of the fluid actuator arrangement.

Furthermore, the control unit 120 includes interrupt units (not shown) associated with the computer for providing a multi-tasking performance and real time computing for automatically adapting the speed of the first, second, third piston rods and other features in accordance with programed data.

The NVM 1920 also includes a second memory unit 1940 for external controlled operation. A data medium storing program P may comprise routines for automatically adapting the speed of the common piston body in accordance with the actual fluid pressure and is provided for operating the control unit 120 for performing the method.

The data medium storing program P comprises a program code stored on a medium, which is readable on the computer, for causing the control unit to perform the method for controlling the motion of the piston rods.

The data medium storing program P further may be stored in a separate memory 1960 and/or in the read/write memory 1950. The data medium storing program P, in this embodiment, is stored in executable or compressed data format.

It is to be understood that when the processing unit 1910 is described to execute a specific function that involves that the processing unit 1910 may execute a certain part of the program stored in the separate memory 1960 or a certain part of the program stored in the read/write memory 1950.

The processing unit 1910 is associated with a data port 999 for communication via a first data bus 1915. The non-volatile memory NVM 1920 is adapted for communication with the processing unit 1910 via a second data bus 1912. The separate memory 1960 is adapted for communication with the processing unit 1910 via a third data bus 1911. The read/write memory 1950 is adapted to communicate with the processing unit 1910 via a fourth data bus 1914. The data port 999 is preferably connectable to data links of a robot apparatus. When data is received by the data port 999, the data will be stored temporary in the second memory unit 1940.

After that the received data is temporary stored, the processing unit 1910 will be ready to execute the program code, according to the above-mentioned method.

Preferably, the signals (received by the data port 999) comprise information about operational status of the fluid actuator arrangement, such as operational status regarding the position of the respective first, second and third piston body relative each other and relative the cylinder housing and/or the actual position of each piston rod and/or stored data of previous positions of the respective piston rods.

The signals may also comprise information about e.g. operational data regarding fluid pressure data and/or load data and/or fluid temperature, etc.

According to one aspect, signals received by the data port 999 may contain information about actual positions of piston rods by means of sensor members. The received signals at the data port 999 can be used by the control unit 120 for controlling and monitoring of the automatically adaptation of the speed and/or motion and/or position of the piston body in accordance with a predetermined value.

The signals received by the data port 999 can be used for automatically moving the piston body between two end positions, i.e. between two cylinder heads of a cylinder housing. The signals can be used for different operations of the fluid actuator arrangement, such as operating the pressurization of each individual clamping device. The information is preferably measured by means of suitable sensor members of the multirod fluid actuator arrangement. The information can be manually fed to the control unit via a suitable communication device, such as a computer display or a touchscreen.

The method can also partially be executed by the control unit 120 by means of the processing unit 1910, which processing unit 1910 runs the data medium storing program P being stored in the separate memory 1960 or the read/write memory 1950. When the control unit 120 runs the data medium storing program P, suitable method steps disclosed herein will be executed.

Alternatively, a first sensor member measures the position of the first piston body relative the first cylinder housing and feeds a first piston body position data to a control unit.

The control unit registers the history of engagements of the first piston body to the respective piston rod.

A second sensor member measures the position of the second piston body relative the second cylinder housing and feeds a second piston body position data to the control unit.

The control unit registers the history of engagements of the second piston body to the respective first and second piston rod.

Each engagement is thus related to and taken into account for each measured data regarding the position of the first and second piston body by means of the control unit.

The second clamping device of the first piston body is operated to engage the second piston rod body and the first clamping device of the second piston body is operated to engage the first piston rod for moving the piston rods a respective first and second distance.

The first piston body has been moved a distance, meantime the first clamping device of the first piston body is activated by the control unit for engagement of the first piston body to the first piston rod. The first sensor member detects this position and the control unit registers that the first piston rod has been moved (by engaging the first clamping device of the first piston body to the first piston rod) a third distance. The second piston body may clamp and move the first piston rod back wherein a fourth distance is registered by the control unit by means of the second sensor member. The control unit is configured to calculate the actual position of the first piston rod relative a starting point by using stored measured values.

In this way only one sensor member needs to be mounted to the respective piston body, wherein the motion of the piston body and actual clamping of a specific piston rod is registered achieving that the motions and positions of the piston rods can be determined.

Figure 12:
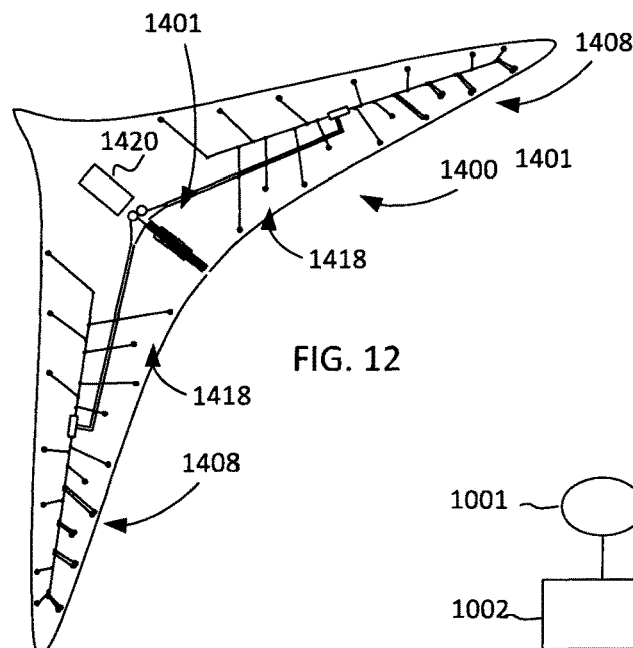
FIG. 12 illustrates a morphing wing aircraft comprising an exemplary multirod fluid actuator arrangement.

FIG. 12 illustrates a morphing wing aircraft 1400 comprising an exemplary multirod fluid actuator arrangement 1401.

Alternatively, the aircraft 1400 is a so called flying wing (in this example), wherein primary control surfaces 1408 are coupled to a first set of piston rods and secondary control surfaces 1418 are coupled to the second set of piston rods.

The primary control surfaces 1408 are flexible portions of the morphing wing.

The secondary control surfaces 1418 are flexible portions of the morphing wing.

The multirod fluid actuator arrangement 1401 comprises a first and a second multirod actuator configured to move the first set of piston rods and comprises a third multirod actuator configured to move the second set of piston rods.

A control unit 1420 is configured to control the motion of the first set of piston rods in a first motion mode and to control the motion of the second set of piston rods in a second motion loitering mode.

Alternatively, the morphing wing of an aircraft comprises a multifunctional system of composite matrix lightweight materials and the integrated multirod fluid actuator arrangement positioned in the central area of morphing wing (flying wing) or Alternatively, the multirod fluid actuator arrangement is mounted in a fuselage of a fixed wing aircraft comprising a morphing wing.

The present invention is of course not in any way restricted to the preferred embodiments described above, but many possibilities to modifications, or combinations of the described embodiments thereof should be apparent to a person with ordinary skill in the art without departing from the basic idea of the invention as defined in the appended claims.

The invention claimed is:

1. A method for controlling a control surface multirod actuator arrangement comprising:
    a first and a second multirod actuator configured to move or clamp around a first set of piston rods, wherein the first and second multirod actuator are coupled to primary control surfaces;
    a third multirod actuator configured to move or clamp around a second set of piston rods, wherein the third multirod actuator is coupled to a secondary control surface;
    a control unit configured to control a motion of the first set of piston rods in a first motion mode and to control a motion of the second set of piston rods in a second motion mode,
    wherein the first motion mode comprises motion of primary control surfaces, wherein the first motion mode constitutes at least one of an aircraft start mode, a landing mode, a climb mode, or a turn mode;
    wherein each piston rod of said first and said second set of piston rods is configured to be individually engaged or disengaged by first, second or third set of engagement and disengagement devices; the method comprising:
    moving at least one piston rod of the first set of piston rods and clamping in parked position at least one piston rod of the second set of piston rods;
    clamping in parked position at least one piston rod of the first set of piston rods and clamping in parked position at least one piston rod of the second set of piston rods; and
    clamping in parked position at least one piston rod of the first set of piston rods and moving at least one piston rod of the second set of piston rods,
    wherein the first set of piston rods are clamped by a first and second piston body of the respective first and second multirod actuator, wherein the first piston body is parked against a head inner wall of the first multirod actuator and the second piston body is parked against a head inner wall of the second multirod actuator in a loitering mode.

2. The method according to claim 1, the method further comprising:
    moving the first set of piston rods and clamping in parked position the second set of piston rods;
    clamping in parked position the first set of piston rods and clamping in parked position the second set of piston rods; and
    clamping in parked position the first set of piston rods and moving the second set of piston rods.

3. The method according to claim 1, the control surface multirod actuator arrangement comprises a first fluid supply system and a second fluid supply system that comprises a fluid accumulator tank member, wherein:
    the moving of at least one piston rod of the first set of piston rods being achieved by pressurizing the first set of engagement and disengagement devices of the first multirod actuator and second multirod actuator,
    wherein the first multirod actuator and second multirod actuator being pressurized for moving the at least one piston rod of the first set of piston rods by means of the second fluid supply system and first fluid supply system, respectively; and
    clamping of the at least one piston rod of the second set of piston rods being achieved by pressurizing the second set of engagement and disengagement devices of the third multirod actuator.

4. The method according to claim 3, wherein clamping of at least one piston rod of the first set of piston rods being achieved by pressurizing the first set of engagement and disengagement devices of the first multirod actuator and second multirod actuator, and
    the moving of at least one piston rod of the second set of piston rods being achieved by pressurizing the third set of engagement and disengagement devices and also pressurizing the third multirod actuator for moving at least one piston rod of the second set of piston rods by means of the second fluid supply system.

5. The method according to claim 3, wherein said pressurizing is achieved by feeding fluid from a fluid accumulator tank member to the first, second, third engagement and disengagement devices of the first, second, third multirod actuators.

6. The method according to claim 1, wherein clamping in parked position at least one piston rod of the first set of piston rods and clamping in parked position at least one piston rod of the second set of piston rods being considered as a loitering mode.

7. The method according to claim 6, further comprising clamping in parked position at least one piston rod of the first set of piston rods and moving at least one piston rod of the second set of piston rods being considered as a loitering mode and a trim mode, respectively.

8. The method according to claim 1, wherein the second motion mode constitutes an aircraft loitering mode.

9. A control surface multirod actuator arrangement comprising:
a first and a second multirod actuator configured to move a first set of piston rods, wherein the first and second multirod actuator are coupled to primary control surfaces;
a third multirod actuator configured to move a second set of piston rods, wherein the third multirod actuator is coupled to a secondary control surface;
wherein each piston rod of said first and second set of piston rods being configured to be individually engaged or disengaged by first, second or third set of engagement and disengagement devices;
a control unit configured to control a motion of the first set of piston rods in a first motion mode and to control a motion of the second set of piston rods in a second mode,
wherein the first motion mode comprises motion of primary control surfaces, wherein the first motion mode constitutes at least one of an aircraft start mode, a landing mode, a climb mode, or a turn mode;
moving at least one piston rod of the first set of piston rods and clamping in parked position at least one piston rod of the second set of piston rods;
clamping of at least one piston rod of the first set of piston rods in parked position and the clamping of at least one piston rod of the second set of piston rods in parked position;
clamping in parked position at least one piston rod of the first set of piston rods and moving at least one piston rod of the second set of piston rods,
wherein the first set of piston rods are clamped by a first and second piston body of the respective first and second multirod actuator, wherein the first piston body is parked against a head inner wall of the first multirod actuator and the second piston body is parked against a head inner wall of the second multirod actuator in a loitering mode.

10. The control surface multirod actuator arrangement according to claim 9, wherein the first, second and third multirod actuator is coupled to a fluid supply via valve devices, wherein the fluid supply comprises a first fluid supply system and a second fluid supply system, wherein the first fluid supply system comprises a first motor and the second fluid supply system comprises a second motor,
wherein the control unit is further configured to switch off the first and second motor and to control the third multirod actuator, whereas a fluid accumulator tank member of the second fluid supply system is configured to provide fluid to the third multirod actuator for moving the second set of piston rods in a second motion mode and clamping the first set of piston rods.

11. The control surface multirod actuator arrangement according to claim 9, wherein the valve devices comprise:
a first control valve coupled to a first cylinder housing for moving a first piston body;
a second control valve coupled to a second cylinder housing for moving a second piston body;
a third directional valve coupled to a third cylinder housing for moving a third piston body;
a respective first logic valve of a first set of logic valves coupled to a respective first clamping device of a first set of engagement and disengagement devices of the first piston body;
a respective second logic valve of a second set of logic valves coupled to a respective second clamping device of a second set of engagement and disengagement devices of the second piston body; and
a respective third logic valve of a third set of logic valves coupled to a respective third clamping device of a third set of engagement and disengagement devices of the third piston body.

12. A non-transitory computer storage medium storing computer-executable instruction adapted for controlling the motion of a control surface multirod actuator system, comprising:
a first and a second multirod actuator configured to move or clamp around a first set of piston rods, wherein the first and second multirod actuator are coupled to primary control surfaces;
a third multirod actuator configured to move or clamp around a second set of piston rods, wherein the third multirod actuator is coupled to a secondary control surface;
a control unit configured to control a motion of the first set of piston rods in a first motion mode and to control a motion of the second set of piston rods in a second motion mode;
wherein the first motion mode comprises motion of primary control surfaces, wherein the first motion mode constitutes at least one of an aircraft start mode, a landing mode, a climb mode, or a turn mode;
wherein said stored computer-executable instructions readable code causing the control unit to perform a method comprising:
moving at least one piston rod of the first set of piston rods and clamping in parked position at least one piston rod of the second set of piston rods;
clamping in parked position at least one piston rod of the first set of piston rods and clamping in parked position at least one piston rod of the second set of piston rods; and
clamping in parked position at least one piston rod of the first set of piston rods and moving at least one piston rod of the second set of piston rods,
wherein the first set of piston rods are clamped by a first and second piston body of the respective first and second multirod actuator, wherein the first piston body is parked against a head inner wall of the first multirod actuator and the second piston body is parked against a head inner wall of the second multirod actuator in a loitering mode.

\* \* \* \* \*